United States Patent [19]

Storm et al.

[11] Patent Number: 4,845,328
[45] Date of Patent: Jul. 4, 1989

[54] APPARATUS FOR AND METHOD OF INDUCTION-HARDENING MACHINE COMPONENTS

[75] Inventors: John M. Storm, Danville; Michael R. Chaplin, Speedway, both of Ind.

[73] Assignee: Contour Hardening Investors, Ltd., Indianapolis, Ind.

[21] Appl. No.: 143,462

[22] Filed: Jan. 13, 1988

[51] Int. Cl.$^4$ ............... H03B 6/36; H03B 6/64; H01F 27/28; G06F 15/46

[52] U.S. Cl. ............... 219/10.59; 219/10.43; 219/10.77; 219/10.79; 364/477; 364/488; 266/125; 266/129; 148/147; 336/225

[58] Field of Search ............... 219/10.43, 10.71, 10.75, 219/10.41, 10.57, 10.59, 10.77, 10.79; 266/124, 125, 126, 129; 148/143, 144, 145, 146, 147, 148, 150, 152; 364/477, 468, 400, 488; 336/223, 225

[56] References Cited

U.S. PATENT DOCUMENTS

| | | | |
|---|---|---|---|
| 2,676,233 | 4/1954 | Foxx | 336/223 X |
| 4,129,846 | 12/1978 | Yablachnikov | 336/180 |
| 4,196,471 | 4/1980 | McClure | 364/477 X |
| 4,220,106 | 9/1980 | Supik | 219/10.43 X |
| 4,414,543 | 11/1983 | Schweitzer, Jr. | 336/223 X |
| 4,639,279 | 1/1987 | Chatterjee | 148/147 |
| 4,673,785 | 6/1987 | Damiani | 219/10.57 |
| 4,675,487 | 6/1987 | Verkasalo | 219/10.43 |
| 4,675,488 | 6/1987 | Mucha et al. | 219/10.43 |

OTHER PUBLICATIONS

Simpson, P. G. *Induction Heating Coil and System Design* 1960, pp. 111–159, McGraw-Hill Book Co. Inc.
Nehl, T. W. "Antic 85: A General Purpose Finite Element Package for Computer Aided design and Analysis of Electromagnetic Devices", IEEE Transactions on Magnetics, vol. 24, No. 1, Jan. 1988, pp. 358–361.
Gagnoud, A. and Leclercq, I., "Electromagnetic Modelling of Induction Devices in Cold Crucible" IEEE Transactions on Magnetics, vol. 24, No. 1, Jan.'88, pp. 573-575.
Calitz, M. F. and du Toit, A. G. "CAD System for Cylindrically Symmetric Devices", IEEE Transactions on Magnetics, vol. 24, No. 1, Jan. 88, pp. 427–430.
"Induction Gear Hardening by the Dual Frequency Method," John M. Storm and Michael R. Chaplin, *Heat Treating Magazine*, vol. 19, No. 6, Jun. 1987.

*Primary Examiner*—A. D. Pellinen
*Assistant Examiner*—David Osborn
*Attorney, Agent, or Firm*—Woodard, Emhardt, Naughton, Moriarty & McNett

[57] ABSTRACT

An induction-hardening machine for the contour hardening of machine components such as gears includes a machine with both high-frequency and low-frequency induction generators operably arranged with corresponding induction coils positioned at a machine workstation and interfacing with computer controls. The high-frequency and low-frequency coils are arranged in a substantially concentric fashion such that the part to be induction hardened may be moved axially from one induction coil to the other depending upon the selected induction hardening process. The computer controls include a microprocessor operable to receive a computer disk which is formatted with specific machine settings and parameters for the automatic running and induction hardening of the particular part. The induction coils and the machine settings on the computer disk are all generated from a computer algorithm consisting of a series of equations and formulae which treat specific part characteristics and parameters so as to define the optimum coils and settings for induction hardening of that particular part.

16 Claims, 6 Drawing Sheets

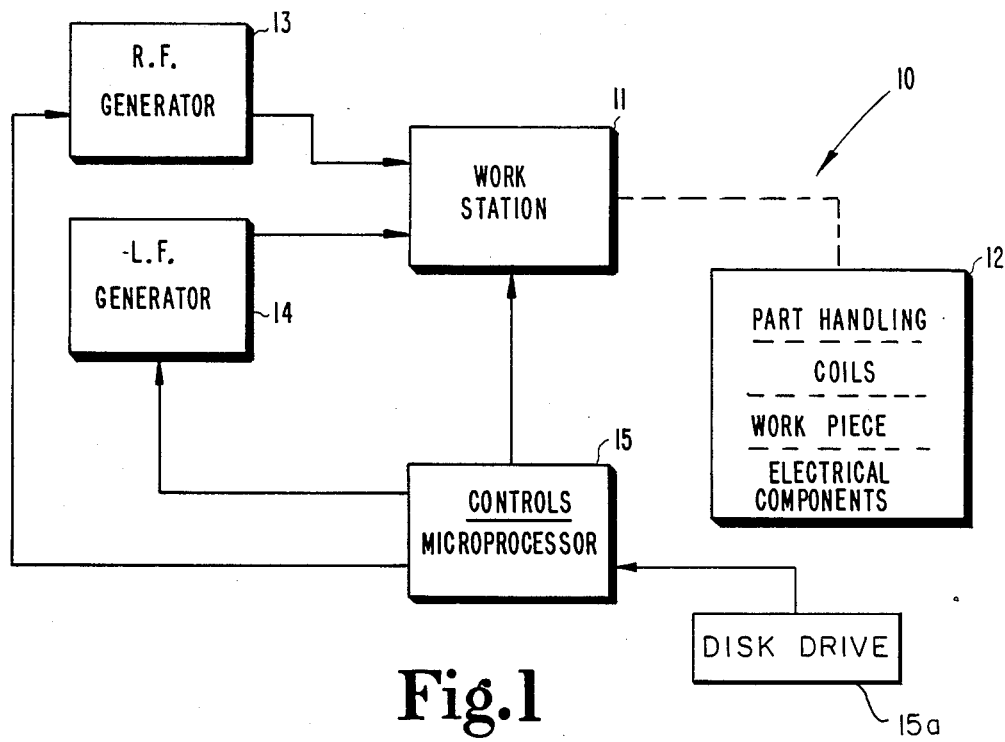
Fig.1
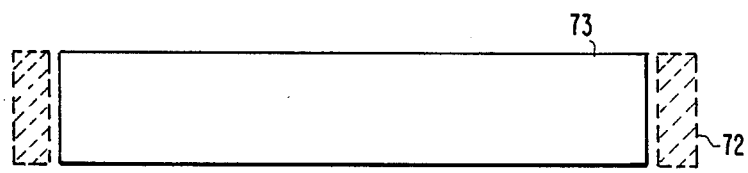
PRIOR ART
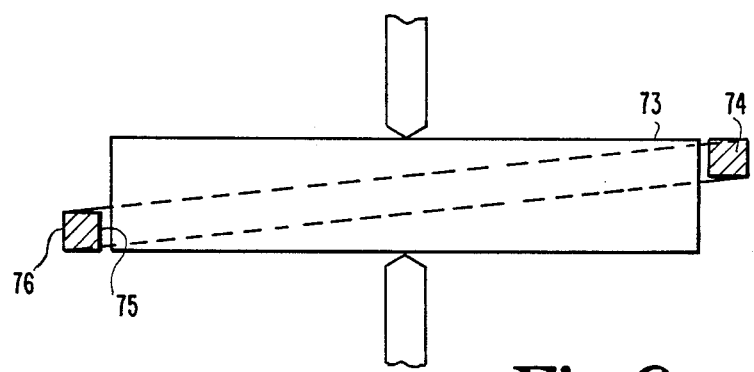
Fig.6

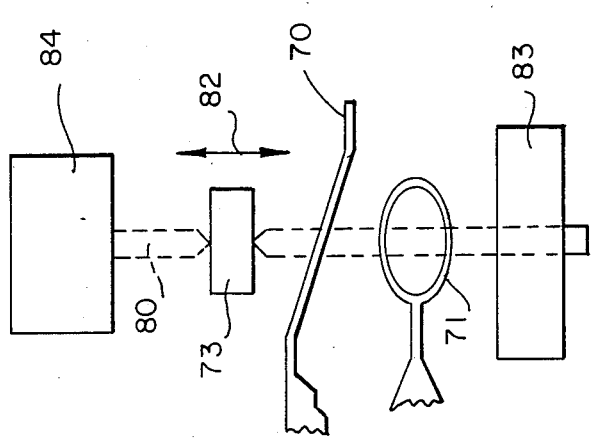
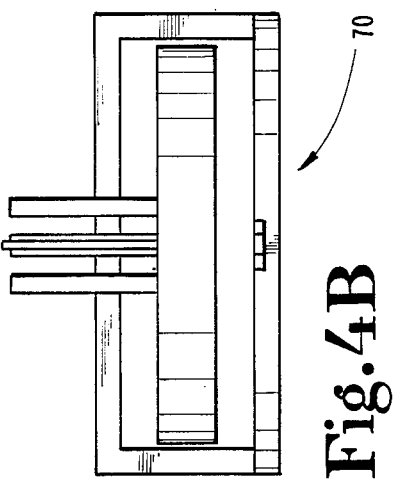
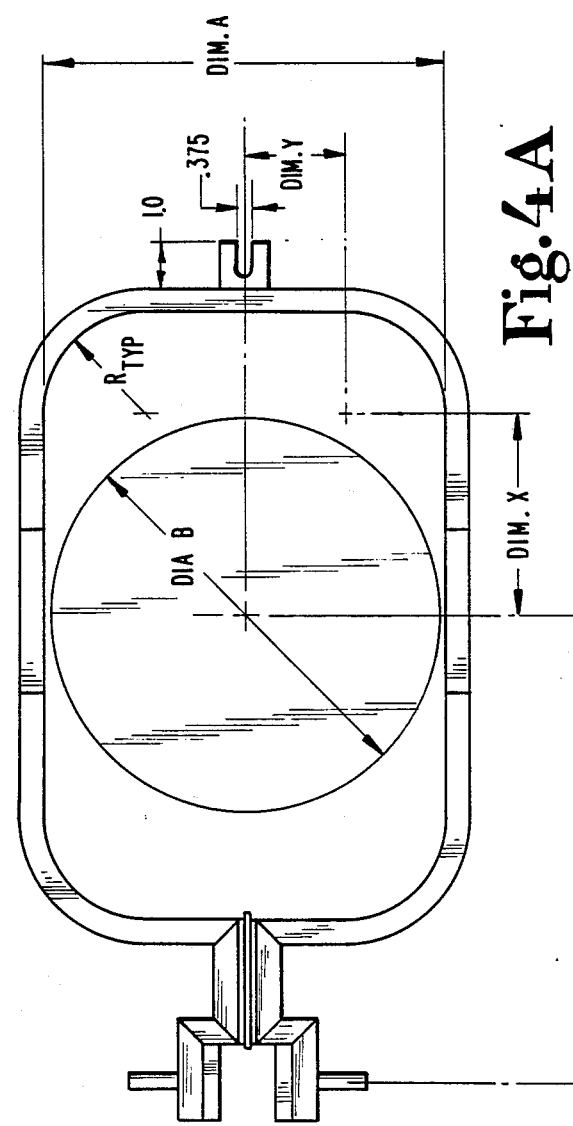
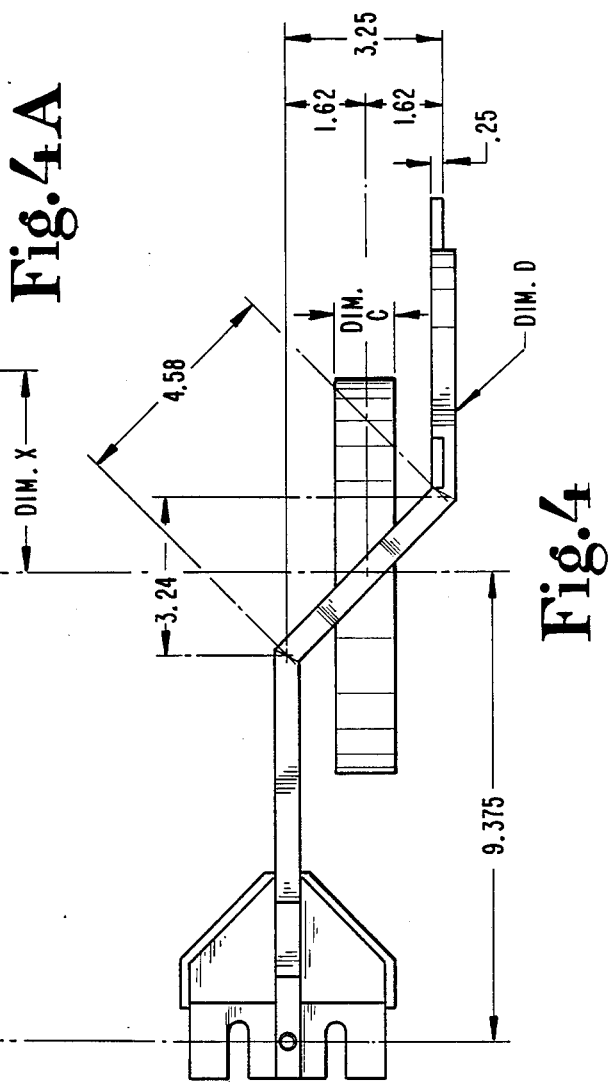

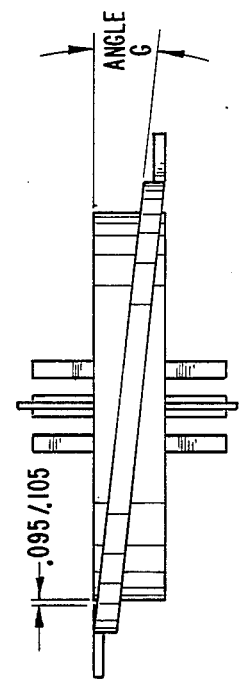
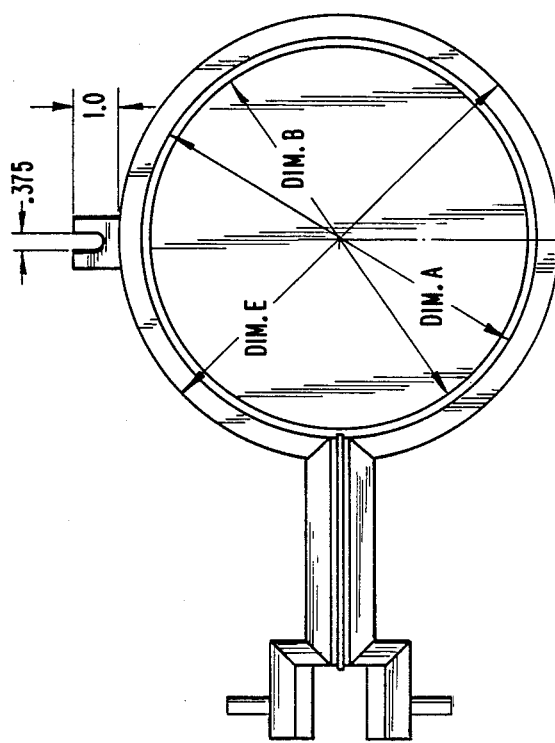
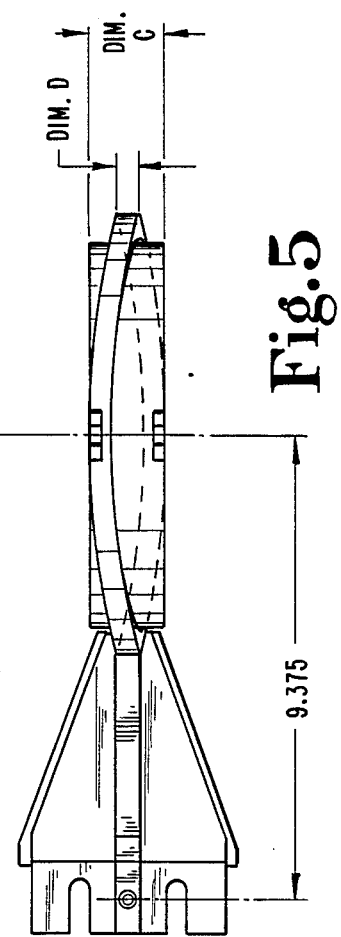

APPARATUS FOR AND METHOD OF INDUCTION-HARDENING MACHINE COMPONENTS

BACKGROUND OF THE INVENTION

The present invention relates generally to the technology of induction heating and more particularly to the use of induction heating for case-hardening of machine components such as gears.

Machine components such as gears, splined shafts and sprockets are frequently subjected to high torque loads, frictional wear and impact loading. The gears in a power transmission, for example, will encounter each of these forces during normal operation. In the typical gear production facility, the machining of gear teeth is followed by heat treatment to harden them. Heat-treating gears can involve many different types of operations, all of which have the common purpose or singular objective of producing a microstructure with certain optimum properties. The hardening process, however, often distorts the gear teeth resulting in reduced and variable quality.

In order to avoid these problems associated with conventional heat-treating and to improve the ability of the machine component (gear) to withstand the aforementioned loads and wear forces, the base metal is given a hardened outer case by selective hardening. In this manner, it is only the outer surface which is altered and the base metal retains its desirable properties such as strength and ductility.

One technique for the selective hardening of this outer case on such machine components as gears is to induction-harden the gear teeth individually. Another hardening technique which is also selective is a process referred to as selective carburizing. Single-tooth induction hardening is performed with a shaped intensifier that oscillates back and forth in the gear tooth space. This is usually done with the gear submerged in the quench. The process is relatively slow because only one gear tooth is processed at a time. Selective carburizing is most widely used and the process involves covering the surfaces to be protected against carburizing with a material that prevents the passage of active carbon during the furnace operation. The most widely used method to stop carbon activity is copper plating. A gear is copper plated on all surfaces except the teeth, then carburized. The part is then copper stripped, finish machined, re-copper plated all over, furnace-hardened, and quenched.

The difficulties and expense of the carburizing process have prompted companies to consider alternative techniques such as induction heating for selective case hardening, but to do so on a larger scale as opposed to the single-tooth method. U.S. Pat. No. 4,675,488, which issued June 23, 1987, to Mucha et al., discloses a variation on the single-tooth process described above, wherein the process involves inductively heating and then quench-hardening a few teeth at a time while the rest of the teeth are cooled for the purpose of preventing drawback of previously hardened teeth (column 1, lines 55-65). While all of the teeth are ultimately induction-hardened, the inductors are extremely complex and expensive. The Mucha et al. patent also mentions the attempt by others for several years to devise a means for induction heating the outer peripheral surfaces of gears by using an encircling inductor so that the gears can be treated by the inductor and then quench-hardened immediately thereafter in order to create the desired case hardening on the outer surface of the gear. The solution suggested by the Mucha et al. patent is to provide two induction heating coils with the workpiece located concentric in the first induction heating coil. This first coil is energized with the first alternating frequency current for a fixed period of time. Once deenergized, the workpiece experiences a time delay period and thereafter the first induction heating coil is reenergized with a second alternating frequency for another fixed period of time, though substantially less than the first period of time with the first alternating frequency. At the end of this second period of time, the workpiece is immediately transferred into the second induction heating coil in a concentric manner and experiences a second delay time. Following this step, the second induction heating coil is energized with a radio frequency current for a third time period and immediately quenching the outer surfaces by quenching liquid sprayed against the surfaces while the workpiece is in the second induction heating coil.

Several years ago, a dual-frequency arrangement for induction heating was described wherein a low-frequency current would be used for preheating the gear teeth and then a high-frequency (radio frequency) current could be used for final heating prior to quench hardening. This dual-frequency arrangement is employed to some extent by the Mucha et al. patent as just described. This dual-frequency concept was also recently described by the present inventors in their article entitled "Induction Gear Hardening by the Dual Frequency Method" which appeared in Heat Treating magazine, Volume 19, No. 6, published in June, 1987, As they explain in their article, the principle of dual-frequency heating employs both high- and low-frequency heat sources. The gear is first heated with a relatively low-frequency source (3-10 KHz), providing the energy required to preheat the mass of the gear teeth. This step is followed immediately by heating with a high-frequency source which will range from 100-300 KHz depending on the gear size and diametral pitch. The high-frequency source will rapidly final heat the entire tooth contour surface to a hardening temperature. The gear is then quenched to a desired hardness and tempered.

Dual-frequency heating is the fastest known way of heating a gear. Heating times range from 0.14 to 2.0 seconds. This compares, for example, with 4-5 minutes required for a laser to scan a gear, tooth by tooth. In dual-frequency heating, the spinning workpiece is preheated while riding on a spindle centering fixture. Then a quick "pulse" achieves optimum final heat. Next the piece indexes into a water-based quench, for a total process time of approximately 30 seconds. Dual frequency is unique among gear-hardening methods in that it allows competing specifications to coexist. That is, for a given case depth requirement and distortion limitation, with conventional hardening methods one requirement tends to consume the other. Because dual-frequency hardening puts only the necessary amount of heat into the part (2-3 times less energy than conventional induction), case depth requirements and distortion specifications can both be met, precisely.

With any induction heating process whether dual- or single-frequency, and regardless of the type of part and its material, the part characteristics dictate the optimum design of both the induction heating coil or coils and the most appropriate machine settings. Only with the properly designed coil and the appropriate machine setting is it possible to achieve the contour and case hardening specifications deemed to be most appropriate from the standpoint of wear and load resistance while still retaining overall part strength, material ductility and part specifications. A gear which is too brittle will fail prematurely, often by a tooth cracking or breaking of the gear blank body.

Traditionally, a fixed coil design has been used for a wide range of different parts and machine settings were made on a "best guess" basis by the induction machine operator. By fixing the coil, one variable is eliminated and the operator attempts to zero in on an acceptable final part by trial and error procedures. The more experienced the operator, hopefully the greater the number and variety of parts he will have experienced and to the extent that he is able to draw on that experience, he may be able to come close to an acceptable part, but only after repeated attempts.

Since this entire approach is not scientific, the best one can hope for is to reach an acceptable part but not an optimum part. This problem is magnified when applying induction heating to irregularly shaped objects such as gears. Heretofore, there has been no attempt to try an derive a set of formulae to precisely determine the most optimal coil specifications and induction machine settings for a given part and which is repeatable, part after part, regardless of the size, shape, material or other characteristics. Instead, gross parameters are selected for the coil based on general part size and then machine settings manipulated until the combination of variables comes close to something that can be accepted.

In order to avoid the uncertainty in coil specifications and machine settings, and to enable induction hardening in a precise and optimum manner, regardless of the type of machine component part or part geometry and features, the present invention provides a machine structure and a method of induction hardening using a series of formulae for establishing coil specifications and machine settings which formulae are based on component part size and features. This process or scientifically calculating the specifications for a unique coil and the machine variables (settings) based on individual part characteristics enables predictable and uniform results for the induction hardening of the part in an orderly and repeatable fashion.

Previously, any calculating which may have been done was rudimentary at best, based only on surface area and depth of penetration. The series of formulae allow the coil and machine variables to be set scientifically rather than by guesswork and the needless trial and error attepts are eliminated while at the same time improving part quality from merely an acceptable or tolerable level to an optimum level.

With the unscientific and haphazard method of prior approaches, there was no control over what variables would be altered by the machine operator and as previously mentioned, altering of one may have an effect on the other such that a suitable combination of variables might never be achieved. With the present invention, although there is some feedback and the possibility if required of adjustment of fine-tuning the settings, only one variable, power, is varied. Further, the feedback and possible need for adjustment is solely to machine component failures or machine parameters going out of tolerance, not because the series of formulae and equations (mathematical algorithm) are imprecise or too loose.

SUMMARY OF THE INVENTION

A method of induction hardening of machine components with the aid of a mathematical algorithm in order to compute induction coil specifications and induction machine settings according to one embodiment of the present invention comprises the steps of providing part specification data pertaining to the machine component, calculating induction coil specifications for the machine component according to the mathematical algorithm, determining induction machine settings according to the mathematical algorithm, constructing the specified induction coil, loading the induction coil on the induction machine, making the determined induction machine settings on the machine, heating the machine component by induction by way of the induction machine and quenching the machine component.

One object of the present invention is to provide an improved method of induction hardening of the machine components.

Related objects and advantages of the present invention will be apparent from the following description.

BRIEF DESCRIPTION OF THE DRAWINGS

FIG. 1 is a block diagram of the induction machine components for use in induction hardening according to a typical embodiment of the present invention.

FIG. 4 is a front elevation view of a low-frequency induction coil suitable for use in practicing the method of the present invention.

FIG. 4A is a top plan view of the FIG. 4 low-frequency induction coil.

FIG. 4B is an end elevation view of the FIG. 4 low-frequency induction coil.

FIG. 5 is a front elevation view of a high-frequency induction coil suitable for use in practicing the method of the present invention.

FIG. 5A is a top plan view of the FIG. 5 high-frequency induction coil.

FIG. 5B is an end elevation view of the FIG. 5 high-frequency induction coil.

FIG. 6 is a diagrammatic comparison between the conventional induction coil relative to the part and the induction coil according to a typical embodiment of the present invention.

FIG. 7 is a diagrammatic illustration of the arrangement of induction coils and workpiece comprising part of the work station.

DESCRIPTION OF THE PREFERRED EMBODIMENT

Figure 2:
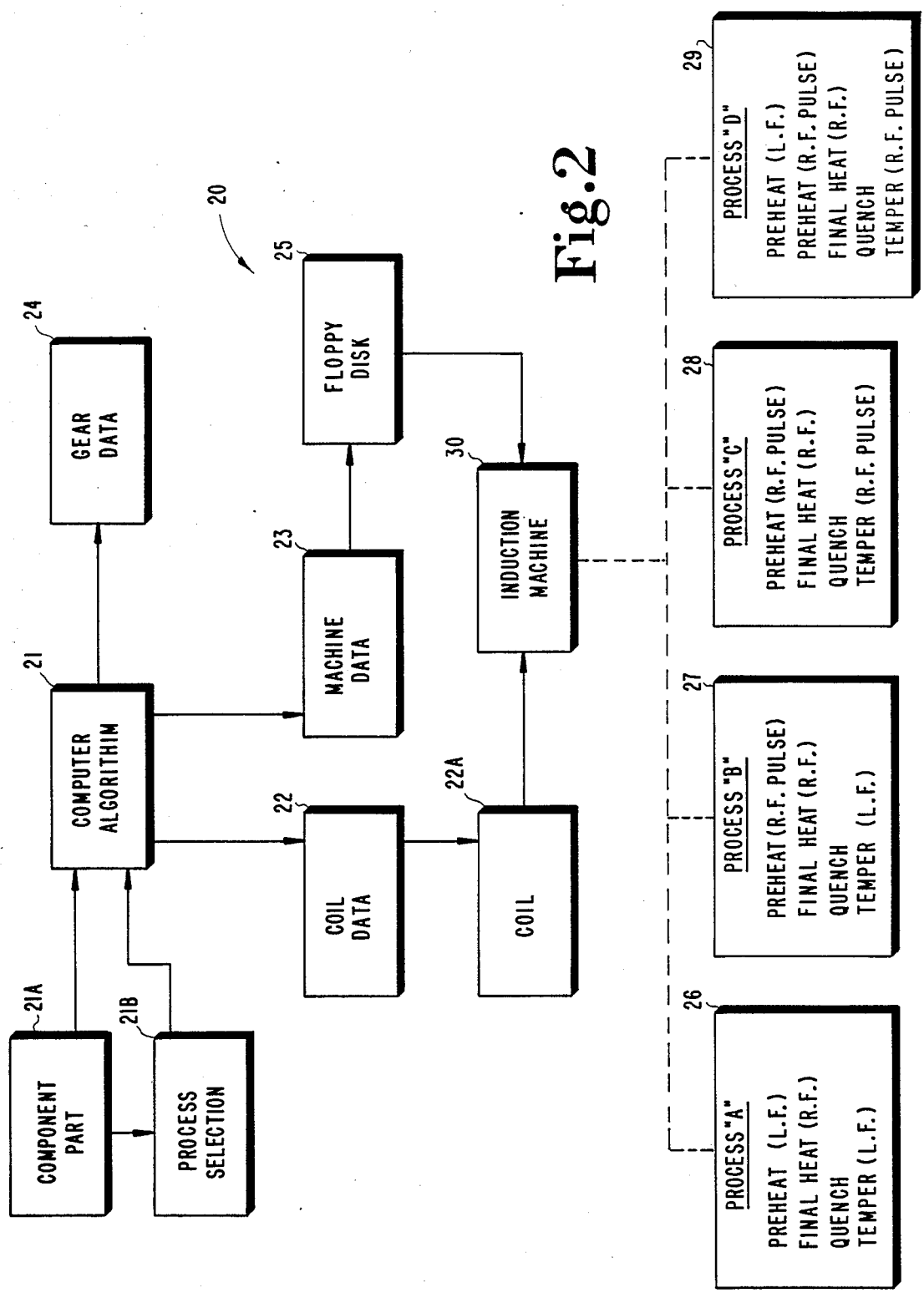
FIG. 2 is a diagrammatic flow chart of the main steps to be followed in the induction hardening of machine components according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated a block diagram 10 of an induction machine for use in the induction case hardening of machine components such as gears. The work station 11 includes all part-handling components, spindles, slides, some of the electrical components such as transformers, the component part (workpiece), induction coil(s) and the quench station, as represented by block 12. As will be described hereinafter the component part to be induction hardened should dictate the particular process steps to be followed in order to optimize the microstructure of the finished, induction-hardened part. In some instances, both high (R.F.) and low (L.F.) frequencies will be applied, while for other parts only R.F. will be used. To this end, FIG. 1 diagrammatically represents the presence of both an R.F. generator 13 and an L.F. generator 14 which are coupled to the work station. The actual coupling of these R.F. and L.F. generators is to their corresponding induction coils, either an R.F. coil singularly, or both an R.F. and L.F. coil used in combination and positioned at the workstation. The control block 15 is representative of the operator controls and interface electronics with the remainder of the machine. These controls will interface both with activities at the workstation as well as with the R.F. and L.F. generators.

In the preferred embodiment, the induction machine is integrated with computer/microprocessor controls enabling the machine to be run automatically by means of machine settings and commands which are input to the microprocessor by a data entry means such as a floppy disk which is loaded into disk drive 15a which is connected to the microprocessor. With the floppy disk prepared with data as to each process time and sequence, power levels, part movement data and so forth, the selected and programmed machine process runs automatically by way of the microprocessor. Due to the critical sequence of events and the importance of precisely controlled times, precise time intervals, powder levels and temperature, computer controls fully integrated with the induction machine settings and machine variables is believed to be essential, and the only means to provide the optimum means of contour-hardening the component part once the induction coil specifications and machine settings are derived.

Referring to FIG. 2, a flow chart 20 is illustrated which discloses the sequence of main steps involve in some of the typical processes which may be employed in the induction hardening method of the present invention using the mathematical or computer algorithm represented by block 21. Initial component part data, represented by block 21A, is taken from the component part blueprint or other part specification data sheets which may exist. Alternatively, the part may be inspected and certain data derived from the physical item. The nature of the part will dictate the particular process selected, represented by block 21B. This component part data and process selection is then inputted into the mathematical (computer) algorithm which is run via computer software and used to calculate the preferred coil design parameters (block 22) and to derive the appropriate machine setting (block 23) for the induction machine which will receive the designed coil(s) (block 22a) and the component part.

In the event both L.F. and R.F. coils are going to be used, depending on the selected process sequence, then the coil design parameters calculated at block 22 will be compiled for both coils. The mathematical algorithm which is structured into computer software to be run on a PC or similar system consists of a series of formulae and equations which utilize component part data which will vary with different parts as the part details vary, thereby enabling the generation of induction coil specifications and machine settings and controls which are precisely tailored to the specific component part and which can be readily altered and reset as the selected component part changes. The machine settings are programmed onto a floppy disk (block 25) which is loaded into the microprocessor via disk drive 15a which is then input into the induction machine (block 03).

Information such as the number of teeth, diametral pitch, pressure angle and face width are just some of the component part data (for gears) which is identified from the print of specification sheet and utilized in the calculation of induction coil parameters and induction machine settings. The computer program which is used to run the component part data is set forth at the end of the specification and is identified as "Listing A." In this program, statements 140 through 280 identify the selected component part data for induction-hardening of a gear.

Obviously different component part variables would be selected for different types of parts, but this particular disclosure focuses principally on gears which would constitute the majority of machine component parts requiring case hardening. The primary input data from the part (block 21A) is in turn used to calculate related data (block 24) regarding the gear or related component part. If the induction hardening machine is equipped with NC or microprocessor type controls which are compatible with floppy disk or similar data storage means as is the case in the preferred embodiment, the derived machine settings can be placed on such a floppy disk (block 25) or on another suitable form of data entry and input into the machine (at block 30) in order to automatically set, control and adjust machine variables.

Once the component part data is derived, the calculations made, the specifically designed coil(s) fabricated and mounted onto the machine at the workstation, and the floppy disk programmed and loaded, the induction hardening process is initiated. Described in FIG. 2 are four different process sequences which have proven to be suitable depending upon particular part geometry and specific part data. Process "A" (block 26) incorporates dual-frequency (R.F. and L.F.) induction wherein the part is first subjected to a low-frequency preheat via a first coil and then a high-frequency (R.F.) final heating step via a second coil. As noted, the tempering step is also achieved by low-frequency induction. In process "B" (block 27), the preheat step and final heat step are both achieved by high-frequency induction. The preheating is achieved by pulses of the high-frequency while the final heating is achieved by application of a continuous high frequency. Process "B," as was true in Process "A," employs a low-frequency temper.

Block 28 illustrates the step for Process "C" which includes a high-frequency pulsed preheat followed by high-frequency final heating. The only difference between Process "B" and Process "C" is that Process "C" uses pulsed high-frequency induction for the tempering step. The fourth and final process selected as an example of some of the process variations which can be utilized with the present invention is set forth at block 29 and identified as Process "D." The only difference between Process "D" and Process "C" is that Process "D" incorporates an additional preheat step, prior to the high-frequency final heat. This additional step to the initial preheating step is performed by high-frequency pulsed induction. The selection of a particular process is governed by part configuration and related aspects such as diaimetral pitch for gears.

In the preferred embodiment, the component part to be induction-hardened is positioned relative to the coil(s) at workstation 11. The component part will be rotated while the coil remains stationary. It is possible to secure the component part between vertical centers (see FIG. 6) or on top or bottom mounting centers or fixtures. The part begins at a top or uppermost position and step by step is indexed downwardly and axially from the first coil, into a second coil, if used, and downwardly again to the quench location. Tempering is performed by one of the coils used for preheat or final heat. To achieve the desired induction heating, the coil must be positioned around and closely to the outer surface of the selected component part. Consequently, the entirety of the part size and contour must be considered in order to decide if the part can physically pass through the preheat coil in order to move downwardly and axially to the final heating coil or on to quench. If any portion of the part is larger than the surface to be hardened, there is no ability to have the workpiece travel through the coil from one position to another. If this part movement is restricted, then Process "C" would be selected since there is no second coil and all heating is done by a single high-frequency induction coil. It is important to recognize that axial symmetry and concentric positioning of the coils with the centers and quench location is needed to maintain precise and accurate part movement throughout the process.

Other considerations involved in the selection of a particular process include the diametral pitch of the gear and the available generator power. For example, for a gear with a diametral pitch of 4–10, Process "A" is preferred if the component part shape permits. For diametral pitch of 10.1 to 24, either process "B" or Process "C" is acceptable, again assuming the component part shape permits. For a diametral pitch of between 3 and 6, Process "D" may be used in lieu of Process "A," depending upon the available generator and its power level. Once the process is selected, a number of part variables are identified to be run via "Listing A" such as number of teeth and face width.

It is preferred to perform low-frequency tempering (Processes "A" and "B") as well as low-frequency preheating and thus processes with these settings are initially preferred. If a part is not receiving sufficient generator power because of the wattage of the generator, then the extra preheat step in Process "D" will achieve an acceptable part without the need to purchase a new, higher-wattage generator.

The low-frequency generator 14 has a frequency range of approximately 3–10 KHz and the heating generated by this low-frequency induction starts deep within the part and works outwardly toward the outer surface of the part. It is possible to select a special frequency within the 3–10 KHz range rather than use a variable range, but a fixed frequency is really only an option when there is a single component part to be hardened and not a variety of parts. The wattage of the low-frequency generator is fixed at 100 Kw using a solid state inverter.

The high-frequency (R.F.) generator 13 has a frequency range of approximately 100–300 KHz. The wattage of this high-frequency generator is a variable between 200 and 900 Kw.

Although four different process sequences have been suggested, it is possible to mix steps from the four processes in order to create some further permutation of process steps beyond what is suggested by Processes "A" through "D".

Figure 3:
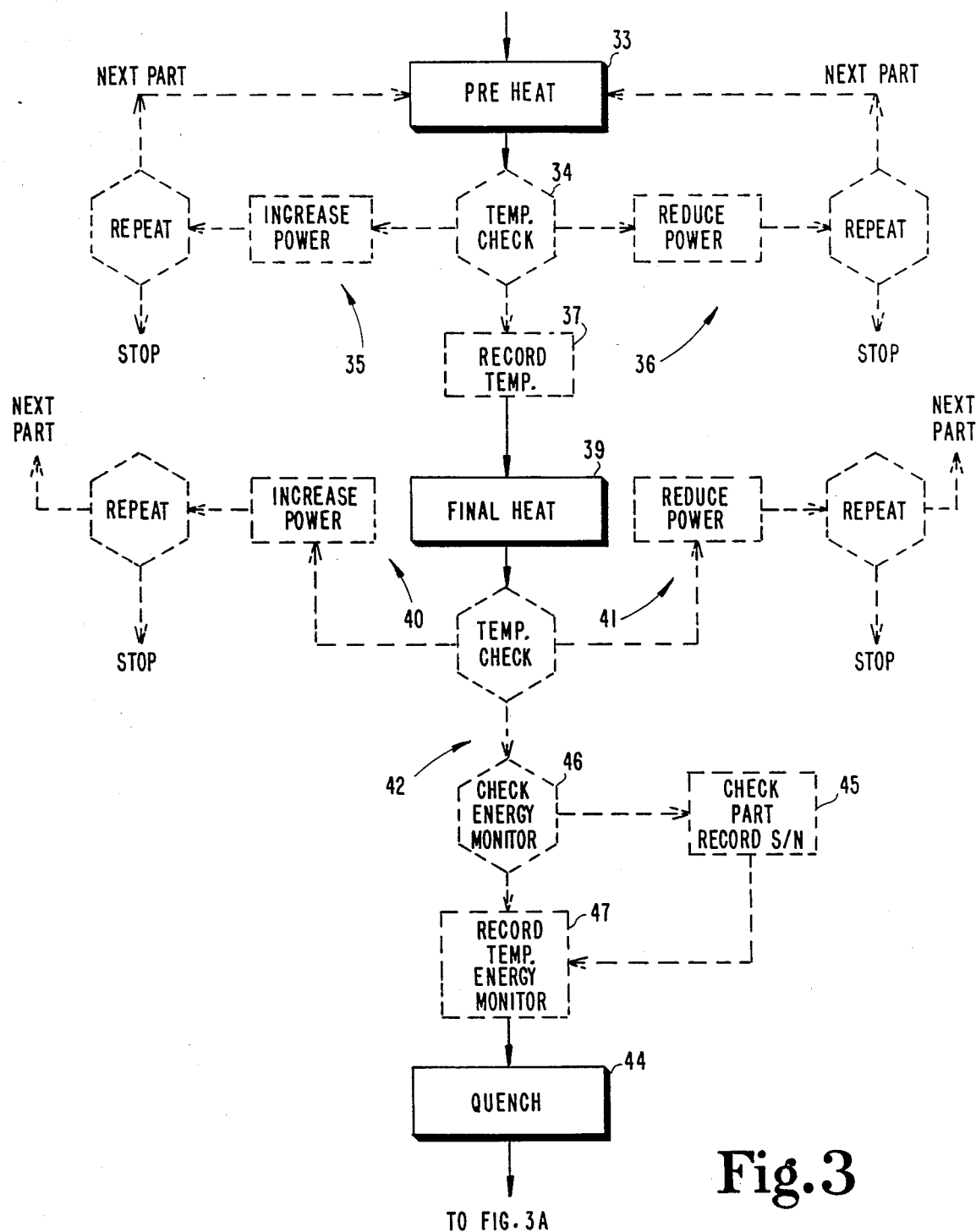
FIG. 3 is a flow chart illustrating the more detailed steps and feedback loops associated with the method set forth in FIG. 2.
Figure 3A:
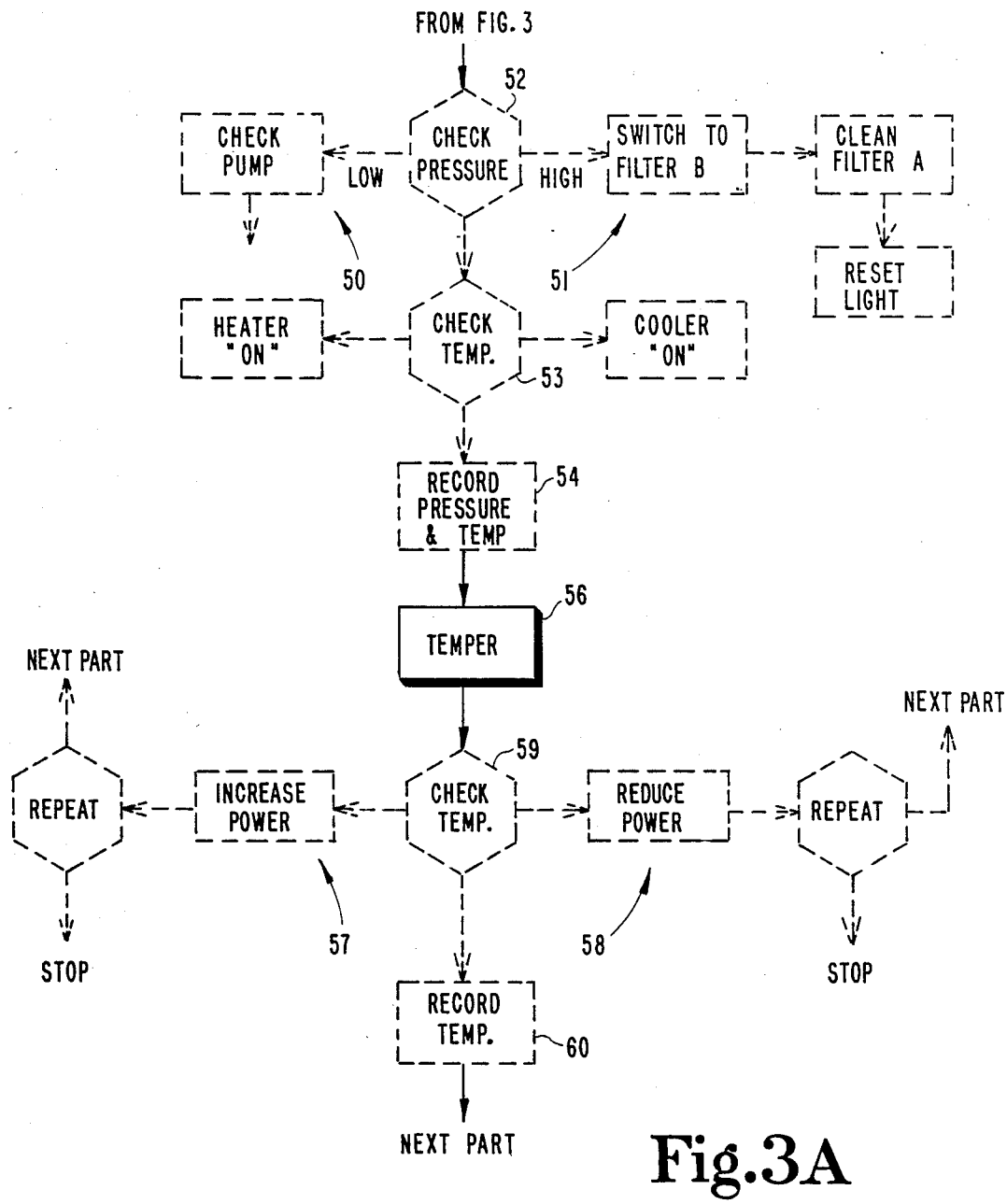
FIG. 3A is a continuation of the FIG. 3 flow chart.

Referring to FIGS. 3 and 3A, the process steps of Process "A" in FIG. 2 incorporating feedback logic is described in detail relative to parts which are initially run according to the series of formulae of the computer algorithm and the particular process. The calculation of coil design parameters and induction machine settings for the particular part has been made by the series of formulae, the machine variables are set (block 32) and the floppy disk is loaded in the induction machine which is computer controlled or computer controllable. The part is next loaded on to the machine and the specially fabricated induction coils are positioned at the workstation.

In Process "A," the fist step is a low-frequency induction preheat at block 33. Following this step, there is a final heating stage at block 39, quench at block 44 and a low-frequency temper at block 56. The numerous blocks in broken-line form and the connecting broken-line arrows are representative of monitoring, checking and feedback functions. However, these functions are only an option, and would not be needed until after several hundred or thousand cycles are run on a new machine. Following the preheat step, the part should be at a predetermined temperature based upon the material of the part and the requisites for proper heat treatment. The part temperature is automatically checked at block 34 and depending on that temperature, three options are available as the next step. If the part temperature is low, the power to the induction coil is increased, logic path 35, and the next part is run. Similarly, if the part temperature is high, the power is reduced, logic path 36, and the next part is run. These power adjustments may be made as many times as desired (X times), until the proper power level is determined. However, if more than two or three attempts are required in order to try and achieve the proper power setting, then there is probably some problem or difficulty with the equipment and the machine should be stopped in order to check the low-frequency generator or sensor.

The third logic path 37 is followed whenever the part temperature is within tolerance to the predetermined level. That particular temperature is recorded and the part goes onto final heating (block 39).

Following the final heating step (high frequency) at block 39, the part temperature checking resumes. The same three logic paths, 40, 41, and 42, exist and the number of repeat tries is set as a variable "X." If the part temperature is low, the power is increased via logic path 40. If the temperature is too high, the power is decreased via logic path 41. In either case, another part is run through the final heating stage and the part temperature checked again until the power level is determined and the part temperature within tolerance. An acceptable part, based on part temperature, passes via logic path 42 to an intermediate stage 43 prior to quench (block 44). At stage 43, the energy monitor is checked and if any reading either above or below the selected level is found, the part serial number is recorded (block 45). All parts arriving at block 46 pass on to block 47 (either directly or via block 45) and from there to quench.

The quench step, illustrated at block 44, includes both pressure and temperature concerns. If the pressure is low following quench, the pump is checked (logic path 50) and if there is a problem at that point, the machine is stopped. If the pressure is high, the filters A and B are switched (logic path 51) so that one filter can be cleaned while the other filter is used in the process. An acceptable pressure reading at block 52 results in a temperature chedk with two adjustments for a temperature which is either high or low. An acceptable temperature reading at block 53 routes the part on to temper after the pressure and temperature readings are recorded (block 54). By providing the quench station with two filter networks which are switchable and cooperatively arranged with the pump, there is a backup if one filter becomes clogged.

The temper step (block 56) is illustrated with two feedback paths 57 and 58. The part temperature is checked at block 59 and the power is either increased or decreased accordingly and the next part run. If too many attempts are necessary to zero in on the right power level to achieve the desired part temperature, the machine is stopped and the generator or sensor checked. An acceptable temperature is recorded (block 60) and the next part is run. Related logic flow paths are followed for processes B, C and D, though with different steps at the preheat stage.

Although the foregoing description may suggest a trial and error approach, it is unlikely that the numerous feedback loops will be required for several hundred if not several thousand cycles of the machine in view of the accuracy of the derived formulae in determining the induction coil parameters and machine settings for any selected part and the repeatability of the machine performance. Only after numerous repeated cycles is there any chance that machine components may experience a degradation in performance. It is only after such numerous cycles that use of the feedback loops need be considered. Further, the monitoring and checking which is performed in the feedback loops is done automatically via computer controls and the computer disk software. Even though each differently styles part which is run via the series of formulae and equations constituting the mathematical algorithm would conceivably result in a different set of coil and machine data, the formulae are capable of treating virtually any type of part. The component part variables are selected and run through the formulae such that optimum case hardening results accompanied by the most desirable set of material properties for the base metal. Further, while there are numerous variables for the coil design and numerous machine settings, the only adjusting which is done, and this after thousands of cycles via the feedback loops, is the power. This is an adjustment which can be automatically made. The validity of the series of formulae used to calculate the coil parameters and machine settings is so high and the results so precise that all other settings are left intact and the minimal amount of tweaking is done solely by a power variation.

The series of computation formulae are arranged into a computer program (Program A) for ease of data entry and calculating. Manual calculating is of course an option by following the computer program logic and equation, but manual calculating is neither as fast nor is convenient as the use of the computer program. Descriptive text has been included as part of the program listing directly in the body of the program in order to assist in an understanding of the variables and the various calculating steps which must be followed. The flow, logic and actual equations and formulae are clearly presented and the resultant calculating based on component part parameters and features is fully described by following the program steps and data entry.

When this main program ("Listing A") is run for a particular part, two supplemental printouts can be generated. These two printouts are also provided at the end of this description and prior to the claims. The first printout is entitled "Listing B" and gives input data, gear data and coil data via three separate sublistings. For a hypothetical company and part, the main program has been run and actual data generated and is listed for illustrative purposes only. The coil data for both low-frequency (L.F.) and high-frequency (R.F.) coils is listed. This coil data is applied to the design variables which are shown for the low-frequency coil 70 (FIGS. 4, 4A and 4B) and the high-frequency coil 71 (FIGS. 5, 5A and 5B). By substituting the actually derived numerical values for these coil variables (A, B, C, etc.) as found on the respective figures there is sufficient design data and dimensional information to fabricate the required induction coil (s). The designed coils 70, 71 are then fabricated and as a result of the precise algorithm which is used, there is a unique match of the coil(s) to the specific part.

The second listing generated from the main program is entitled "Listing C" and prints all machine variables which must be set. This listing also provides step-by-step instructions as to what machine settings must be made, when and in what sequence. These settings are all done precisely and automatically by loading of the generated floppy disk into the disk drive which is connected to the microprocessor.

Another feature of the present invention is the use of an inclined or angled high-frqeuency induction coil 71 which is placed around the part so as to create the visual effect of a single spiral pitch on a cylinder. The part is rotated at approximately 600 rpm while the coil remains stationary. This coil configuration is illustrated in FIG. 6 and is diagrammatically shown relative to a conventional coil 72 on the same part 73. In the traditional or prior art approach, the induction coil is generally a straight cylinder or cylindrical sleeve which has an axial height that is approximately the same as the part area to be hardened. The part is rotated at a slower rate, approximately 50 rpm. These conditions result in poor quality case hardening which penetrates deep into the base metal of the part. In the case of gears and related tooth components, these teeth become too brittle and may break or crack. By the use of the angled induction coil 74 and a much higher RPM to the part, 600 RPM as opposed to approximately 50 in prior at devices, the case hardening is extremely uniform and truly provides a hardened case of uniform thickness over the base metal which retains its desirable strength, material ductility and part specifications. These prior art approaches and the configuration of the present invention with this angled induction coil approach are compared in FIG. 6.

Referring to FIG. 7, one arrangement for some of the key components of the present invention is illustrated in diagrammatic form. As indicated, the induction hardening begins with the workpiece 73, in the preferred embodiment a gear, mounted between vertical centers 80 and 81 (shown in broken line form). An arrow 82 denotes the direction of axial movement for the gear which is initially positioned within low-frequency induction coil 70. The next step is to pass the gear to the high-frequency induction coil 71 and from there to the quench station 83. If a low-frequency temper is called for, the gear oves axially back to the low-frequency coil. Rotary drive member 84 imparts the desired rotary motion to the gear.

The angled induction coil is best described as having an annular ring shape which is spiralled with straight and substantially parallel inner and outer walls 75 and 76, respectively.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

```
560 IF EORI = 1 THEN GOTO 610
570 PROL          = (R1-R2)/COS(PHINR):'........    SEE FIGURE 1
580 TX            = ((ATT/D)+I1-I2)*(R1*2!):' .     ARC T AT OD
590 A3            = ((.05/PND)*F2)*N:' ........     ROOT SURFACE AREA
600 GOTO 640
610 PROL          = (R2-R1)/COS(PHINR):' .......    SEE FIGURE 2
620 TX            = ((ATT/D)-I1+I2)*(R1*2!):' .     ARC T AT ID
630 A3            = ((.01/PND)*F2)*N:' ........     ROOT SURFACE AREA
640 A2            = TX*F2*N:' .................     OD or ID SURFACE AREA
650 A1            = (PROL*F2*2!)*N:' ...........    PROFILE SUFACE AREA
660 AREA          = A1+A2+A3:' ................     TATAL SURFACE AREA
670 LEAD          = 0!
680 IF PSI > 0! THEN LEAD = (PI*D)/TAN(PSIR):' .    HELICAL LEAD
690 PSIB          = ATN((TAN(PSIR)/D)*DB):' ...     BASE HELICAL ANGLE
700 IF EORI =1 THEN GOTO 730
710 KT            = (ATT/D)+I1:' ..    ANGLE,ORIGIN OF INVOLUTE TO CL TOOTH,EXT
720 GOTO 740
730 KT            = (ATT/D)-I1:' ..    ANGLE,ORIGIN OF INVOLUTE TO CL TOOTH,INT
740 TSA           = PI/N
750 M             = 0
760 IF EORI = 1 THEN M = 1
770 ARCT=ATT:PITCHDIA=D:PHIATD=PHIR:BASEDIA=DB
780 NTEETH=N:ROOTDIA=DR:OD=ODORID:INVPHX=I1
790 GOSUB 3170:' ....................    SUBROUTINE, MEASUREMENT OVER/BETWEEN
800 DOB           = DOORB:' ........    MEASUREMENT OVER/BETWEEN PINS OR BALLS
810 ROB           = ROORB:' ........    RADIUS OVER/BETWEEN
820 CON           = CONR:' .........    PIN/BALL CONTACT RADIUS
830 PHIC          = CONPHI:' .......    PIN/BALL CONTACT PRESSURE ANGLE
840 PEX           = PEXACT:' .......    EXACT PIN/BALL SIZE CONTACTING AT
850 F1            = FACE/3
860 ' .......
870 ' .......
880 IF EORI = 0 THEN ADJ=ODORID+(2!*AIRGAP)
890 IF EORI = 1 THEN ADJ=ODORID-(2!*AIRGAP)
900 ' DIMENSION "A" COPPER
910 A(1)          = .1875:A1(1)=3:A2(1)=16:'........ 3/16
920 A(2)          = .25:  A1(2)=1:A2(2)=4:' ........ 1/4
930 A(3)          = .3125:A1(3)=5:A2(3)=16:'........ 5/16
940 A(4)          = .375: A1(4)=3:A2(4)=8:' ........ 3/8
950 A(5)          = .5:   A1(5)=1:A2(5)=2:' ........ 1/2
960 A(6)          = .625: A1(6)=5:A2(6)=8:' ........ 5/8
970 A(7)          = .75:  A1(7)=3:A2(7)=4:' ........ 3/4
980 A(8)          = .875: A1(8)=7:A2(8)=8:' ........ 7/8
990 A(9)          = 1!:   A1(9)=1:A2(9)=1:' ........ 1/1
1000 FOR I    = 1 TO 9
1010 OPP          = FACE-A(I)
1020 COILFLAT(I)  = SQR(ADJ^2+OPP^2)
1030 ANGLE(I)     = ATN(OPP/ADJ)*(180!/PI)
1040 II           = INT(ABS(ANGLE(I)))
1050 DEGS(I)      = II
```

```
1060 II              = (ABS(ANGLE(I))-II)*60
1070 MINS(I)         = INT(II)
1080 SECS(I)         = (II-MINS(I))*60
1090 IF ANGLE(I) <1 THEN DEGS(I)=-1!*DEGS(I)
1100 NEXT I
1110 FOR I=1 TO 9
1120 IF F1 <= A(I) THEN GOTO 1140
1130 NEXT I
1140 COPPER = A(I-1)
1150 IF COPPER < .25 THEN COPPER=.25
1160 GOSUB 2120:' WRITE GEAR DATA
1170 GOSUB 1750:' WRITE COIL DATA
1180 IF EORI=1 THEN GOSUB 2100
1190 GOSUB 2330:'RF POWER AND TIME
1200 GOSUB 2660:'MACHINE VARIABLES
1210 '
1220 IF CODE1=0 THEN GOSUB 10000:'CHI MACHINE PROGRAM PROCESS A
1222 IF CODE1=1 THEN GOSUB 12000:'CHI MACHINE PROGRAM PROCESS B
1224 IF CODE1=2 THEN GOSUB 14000:'CHI MACHINE PROGRAM PROCESS C
1226 IF CODE1=3 THEN GOSUB 16000:'CHI MACHINE PROGRAM PROCESS D
1230 PRINT FRE(12)
1240 END
1250 'WRITE INPUT DATA
1260 PRINT#1, "                    CONTOUR HARDENING,INC."
1270 PRINT#1, "                    7898 ZIONSVILLE ROAD"
1280 PRINT#1, "                    INDIANAPOLIS, INDIANA 46268"
1290 PRINT#1, :PRINT#1,
1300 PRINT#1, "             COIL DESIGN/ADAPTIVE CONTROL ";CHR$(171);:PRIN
T#1, " JUNE 1987"
1310 PRINT#1, CHR$(27);CHR$(31)
1320 PRINT#1, "                    MICROPLUSE    TM"
1330 PRINT#1, CHR$(27);CHR$(32)
1340 PRINT#1,
1350 PRINT#1, "       I N P U T   D A T A"
1360 PRINT#1,
1370 PRINT#1, USING "  CUSTOMER ................... \
     \";CUST$
1380 PRINT#1, USING "  PART NUMBER ................ \              \";PART$
1390 PRINT#1, USING "  DATE ....................... \              \";DAT$
1400 PRINT#1, USING "  PROGRAM NAME ............... \              \";PNAME$
1410 PRINT#1,
1420 PRINT#1, USING "  NUMBER OF TEETH .............     ###";N
1430 PRINT#1, USING "  DIAMETRAL PITCH .............    ##.####";PND
1440 PRINT#1, USING "  PRESSURE ANGLE (Normal) .......  ##.####";PHIN
1450 IF EORI = 1 THEN GOTO 1480
1460 PRINT#1, USING "  OUTSIDE DIAMETER,max .........   ##.####";ODORID
1470 GOTO 1490
1480 PRINT#1, USING "  INSIDE DIAMETER,min ..........   ##.####";ODORID
1490 IF EORI = 1 THEN GOTO 1520
1500 PRINT#1, USING "  ROOT DIAMETER,min ............   ##.####";DR
1510 GOTO 1530
1520 PRINT#1, USING "  ROOT DIAMETER,max ............   ##.####";DR
1530 PRINT#1, USING "  ROOT FILLET RADIUS ...........   ##.###";RF
1540 PRINT#1, USING "  ARC TOOTH THICKNESS(normal) ..   ##.####";AT
1550 PRINT#1, USING "  FACE WIDTH,max ...............   ##.####";FACE
1560 PRINT#1, USING "  HELIX ANGLE,HAND .............   ##.####,\ \";PSI,HAND$
1570 PRINT#1, USING "  MEASURING PIN or BALL DIA ....   ##.####";PIND
1580 IF EORI =0 THEN PRINT#1, "  GEAR TYPE ....................       EXTERNAL"
1590 IF EORI =1 THEN PRINT#1, "  GEAR TYPE ....................       INTERNAL"
1600 PRINT#1, USING "  COIL TO PART AIR GAP / SIDE ..   ##.####";AIRGAP
```

```
1610 PRINT#1, USING "   MATERIAL CODE ................  ###";MATCODE
1620 PRINT#1, USING "   CODE 1 (PROCESS) .............. \              \";A$
1630 PRINT#1, USING "   CODE 2 (MOUNTING) ............. \              \";B$
1740 RETURN
1750 'WRITE COIL DESIGN DATA
1760 PRINT#1,CHR$(12)
1770 PRINT#1,
1780 PRINT#1,         "  ........ COIL DATA ........"
1790 PRINT#1,
1800 PRINT#1, USING " JOB NUMBER ....................\
      \";JN$
1810 PRINT#1, USING " PART NUMBER/CUSTOMER ..........\
      \";PART$
1820 PRINT#1,
1830 PRINT#1,        " DIMENSION -A- COPPER         COIL ANGLE         C
OIL DIAMETER (flat)"
1840 PRINT#1,        "  (inches) (MATRIX SELECTION)(degrees)  (deg  min  sec)   I
D/EXT  , OD/INT"
1850 PRINT#1,
1860 FOR I = 1 TO 9
1870 PRINT#1, USING "   #.####    ( #/## )      ##.####      ##  ##  ##.##
    ###.###";A(I),A1(I),A2(I),ANGLE(I),DEGS(I),MINS(I),SECS(I),COILFLAT(I)
1880 NEXT I
1890 IF EORI=1 THEN RETURN
1900 PRINT#1,:PRINT#1,
1910 '   DIMENSIONS FOR P/N S 6800006,6800003,6800008, AND 6800009
1920 PRINT#1,        "       DIMENSIONS FOR P/N 6800006 (COIL ASSY, RF)"
1930 PRINT#1,
1940 PRINT#1, USING "       DIA A .......... ##.###";ODORID+AIRGAP*2!
1950 PRINT#1, USING "       DIA B .......... ##.###";ODORID
1960 PRINT#1, USING "       DIM C .......... ##.###";FACE
1970 PRINT#1, USING "       DIM D .......... ##.###";COPPER
1980 PRINT#1,:PRINT#1,
1990 PRINT#1,        "       DIMENSIONS FOR P/N 6800003 (COIL ASSY, LF)"
2000 PRINT#1,
2010 PRINT#1, USING "       DIM A .......... ##.###";ODORID+AIRGAP*2!
2020 PRINT#1, USING "       DIA B .......... ##.###";ODORID
2030 PRINT#1, USING "       DIM C .......... ##.###";FACE
2040 PRINT#1, USING "       DIM D .......... ##.###";COPPER
2050 PRINT#1, USING "       DIM R .......... ##.###";(R1+AIRGAP)*.5
2060 PRINT#1, USING "       DIM X .......... ##.###";(R1+AIRGAP)*.5
2070 PRINT#1, USING "       DIM Y .......... ##.###";R1+AIRGAP
2080 PRINT#1,:PRINT#1,
2090 RETURN
2100 '   DRAWING DATA FOR INTERNAL GEAR COIL GEOMETRY
2110 RETURN
2120 ' WRITE GEAR DATA
2130 PRINT#1, CHR$(12)
2140 PRINT#1,        "  ........ GEAR DATA ........"
2150 PRINT#1,
2160 PRINT#1, USING " PITCH DIA ....................    ##.######";D
2170 PRINT#1, USING " BASE CIRCLE DIA ..............    ##.######";DB
2180 PRINT#1, USING " TRANSVERSE PRESSURE ANGLE .....   ##.######";PHIR*DEGREE
2190 PRINT#1, USING " TRANSVERSE DIAMETRAL PITCH ....   ##.######";PD
2200 PSIXR=ATN((TAN(PSIR)/D)*ODORID)
2210 PRINT#1, USING " ARC T at OD/ID (Normal) .......   ##.####";TX*COS(PSIXR)
2220 PRINT#1, USING " LEAD .........................  ####.######";LEAD
2230 PRINT#1, USING " BASE HELIX ANGLE .............    ##.######";PSIB*DEGREE
2240 PRINT#1, USING " MEASUREMENT OVER/BETWEEN ......   ##.####";DOB
2250 PRINT#1,
2260 PRINT#1, USING " 1/3 FACE WIDTH ........ ###.###";F1
```

```
2270 PRINT#1, USING "  SURFACE AREA ......... ###.### Sq in";AREA
2280 IF EORI = 1 GOTO 2310
2290 PRINT#1, USING "  CIRCUMFERENCE AT OD ... ###.###";PI*ODORID
2300 GOTO 2320
2310 PRINT#1, USING "  CIRCUMFERENCE AT ID ... ###.###";PI*ODORID
2320 RETURN
2330 'SUBROUTINE RFPOWER
2340 KWMAX = 625!
2350 K(1) =45!:K(2) =32!:K(3) =28!:K(4) =24.5:K(5) =21.5:K(6) =19!
2360 K(7) =17!:K(8) =15!:K(9) =14!:K(10)=13!:K(11)=12!:K(12)=11!
2370 K(13)=10.5:K(14)=10!:K(15)=9.5:K(16)=9!:K(17)=8.5:K(18)=8!
2380 K(19)=7.5:K(20)=7.25:K(21)=7!:K(22)=6.5:K(23)=6.25:K(24)=6!
2390 '
2400 '
2410 '
2420 '
2430 '
2440 INC = 5
2450 IF AREA > 120 THEN C = 5!
2460 IF AREA > 120 THEN GOTO 2520
2470 FOR I = 1 TO 23
2480 IF AREA <=INC THEN GOTO 2510
2490 INC = INC+5!
2500 NEXT I
2510 C = K(I)
2520 RFPOWER = ((C*AREA)/KWMAX)*100
2530 IF PND <= 2 THEN GOTO 2600
2540 IF PND <= 3 THEN GOTO 2610
2550 IF PND <= 8 THEN GOTO 2620
2560 IF PND <=10 THEN GOTO 2630
2570 IF PND <=12 THEN GOTO 2640
2580 KHZ = 230
2590 GOTO 2650
2600 KHZ = 130:GOTO 2650
2610 KHZ = 140:GOTO 2650
2620 KHZ = 150:GOTO 2650
2630 KHZ = 160:GOTO 2650
2640 KHZ = 180
2650 RETURN
2660 ' MACHINE VARIABLES
2670 PORAL=12:TOPCL=10:BOTCL=14:XPARTCL=1
2680 '
2690 '
2700 '
2710 '
2720 YCLAMP     = 41-PORAL-TOPCL-BOTCL:V1=YCLAMP
2730 XPREHEAT   = 4+XPARTCL:            V2=XPREHEAT
2740 XFINHEAT   = XPREHEAT+5:            V3=XFINHEAT
2750 XQUENCH    = XFINHEAT+5:            V4=XQUENCH
2760 XTEMPER    = XPREHEAT:              V5=V2
2762 RPMPH      = 450
2763 RPMFH      = 600
2764 RPMQ       = 5
2765 V6=5:V7=5:V36=1:V37=1:V38=1
2766 RPMT       = 450
2770 V10        = (2000/(600/RPMPH))+2000
2780 V11        = (2000/(600/RPMFH))+2000
2790 V12        = (2000/(600/RPMQ))+2000
2800 V13        = (2000/(600/RPMSD))+2000
2810 V14        = (2000/(600/RPMT))+2000
```

```
2820 V20        = 0!
2830 V21        = RFPOWER
2840 V22        = 0!
2841 IF CODE1= 0 THEN GOTO 2850
2842 IF CODE1= 1 THEN V30=1!:GOTO 2980
2843 IF CODE1= 2 THEN V30=1!:GOTO 2980
2844 IF CODE1= 3 THEN V36=1!
2850 IF AREA <= 5 THEN V30=6:GOTO 2980
2860 IF AREA <= 10 THEN V30=8:GOTO 2980
2870 IF AREA <= 20 THEN V30=11:GOTO 2980
2880 IF AREA <= 30 THEN V30=16:GOTO 2980
2890 IF AREA <= 40 THEN V30=21:GOTO 2980
2900 IF AREA <= 50 THEN V30=26:GOTO 2980
2910 IF AREA <= 60 THEN V30=32:GOTO 2980
2920 IF AREA <= 70 THEN V30=37:GOTO 2980
2930 IF AREA <= 80 THEN V30=42:GOTO 2980
2940 IF AREA <= 90 THEN V30=48:GOTO 2980
2950 IF AREA <=100 THEN V30=53:GOTO 2980
2960 IF AREA <=110 THEN V30=58:GOTO 2980
2970 IF AREA <=120 THEN V30=63
2980 'CONTINUE
2990 V31        = 1!
3000 IF AREA <= 5   THEN V32=.669:GOTO 3060
3010 IF AREA <= 15  THEN V32=.375:GOTO 3060
3020 IF AREA <= 30  THEN V32=.457:GOTO 3060
3030 IF AREA <= 45  THEN V32=.407:GOTO 3060
3040 IF AREA <= 55  THEN V32=.539:GOTO 3060
3050 IF AREA <=120  THEN V32=.707:GOTO 3060
3060 'CONTINUE
3070 V33        =V30-5.5
3072 IF CODE1=2 THEN V33=15
3080 V34        =3!
3090 V35        =V30-V30*.5
3100 V40        =3000
3110 V41        =1500
3120 V42        =4000
3130 V43        =4000
3140 V44        =2500
3150 IF CODE1= 0 THEN GOTO 3154
3151 IF CODE1= 1 THEN GOTO 3156
3152 IF CODE1= 2 THEN GOTO 3158
3153 IF CODE1= 3 THEN GOTO 3160
3154 TOTALTIME = V30+V31+V32+V33+V34+V35
3155 RETURN
3156 TOTALTIME = V30*V6+V31*V6+V32+V33+V34+V35
3157 RETURN
3158 TOTALTIME = V30*V6+V31*V6+V32+V33+V34+V35*V7
3159 RETURN
3160 TOTALTIME = V30+(V31*V6)*2+V32+V33+V34+V35+V36
3161 RETURN
3170 '  MEASUREMENT OVER/BETWEEN PINS or BALLS
3180 '
3190 CPSIB  = COS(PSIB)
3200 IF M   = 0 THEN INVPHXX = (ARCT/PITCHDIA)+INVPHX+(PIND/(BASEDIA*CPSIB))-
PI/NTEETH)
3210 IF M   = 1 THEN INVPHXX =(-ARCT/PITCHDIA)+INVPHX-(PIND/(BASEDIA*CPSIB))+(
PI/NTEETH)
3220 IF INVPHXX < 0! THEN PRINT "WARNING No. 12"
3230 IF INVPHXX > 0! THEN GOTO 3250
3240 GOTO 3470
```

```
3250 GIVINV = INVPHXX:GOSUB 3720:PHX=ANS
3260 HALFN  = NTEETH*.5
3270 II     = INT(HALFN)
3280 ANN    = II
3290 IF M      = 0 THEN AA = PIND
3300 IF M      = 1 THEN AA = -1!*PIND
3310 IF ANN = HALFN THEN GOTO 3360
3320 RR     = (90!/NTEETH)*RADIAN
3330 DOORB  = (BASEDIA/COS(PHX))*COS(RR)+AA
3340 ROORB  = ((BASEDIA/COS(PHX))+AA)*.5
3350 GOTO 3390
3360 'CONTINUE
3370 DOORB  = (BASEDIA/COS(PHX))+AA
3380 ROORB  = DOORB*.5
3390 'CONTINUE
3400 DCTR   = BASEDIA/COS(PHX)
3410 RCTR   = DCTR*.5
3420 OPP    = SQR(RCTR^2-(BASEDIA*.5)^2)
3430 B      = OPP-AA*.5
3440 CONR   = SQR(B^2+(BASEDIA*.5)^2)
3450 FX     = FNACOS(BASEDIA/(CONR*2!))
3460 CONPHI = FX*DEGREE
3470 'CONTINUE
3480 Q1     = TAN(PHIATD)*BASEDIA*.5
3490 ARCS   = PX-ARCT
3500 Q4     = ARCS/PITCHDIA
3510 IF M      = 0 THEN Q5 = PHIATD+Q4
3520 IF M      = 1 THEN Q5 = PHIATD-Q4
3530 Q6     = TAN(Q5)*BASEDIA*.5
3540 IF M      = 0 THEN PEXACT = (Q6-Q1)*2!
3550 IF M      = 1 THEN PEXACT = (Q1-Q6)*2!
3560 IF INVPHX < 0! THEN PIND = PEXACT
3570 IF INVPHX < 0! THEN GOTO 3200
3580 BOT    = DCTR-AA
3590 IF M      =1 THEN GOTO 3620
3600 IF BOT  <= ROOTDIA THEN PRINT "WARNING No. 16"
3610 GOTO 3640
3620 'CONTINUE
3630 IF BOT  >= ROOTDIA THEN PRINT "WARNING No. 16"
3640 'CONTINUE
3650 IF M      = 1 THEN GOTO 3680
3660 IF DOORB <= OD THEN PRINT "WARNING No. 17"
3670 GOTO 3700
3680 'CONTINUE
3690 IF DOORB >= OD THEN PRINT "WARNING No. 17"
3700 'CONTINUE
3710 RETURN
3720 '   THE ANGLE WHOSE INVOLUTE IS, GIVINV
3730 DEC    = .000001
3740 ANGLE  = .1
3750 DELX   = .1
3760 'CONTINUE
3770 INVOLUTE= FNINV(ANGLE)
3780 IF INVOLUTE < GIVINV THEN GOTO 3810
3790 IF INVOLUTE = GIVINV THEN GOTO 3860
3800 IF INVOLUTE > GIVINV THEN GOTO 3830
3810 ANGLE  = ANGLE+DELX
3820 GOTO 3760
3830 ANGLE  = ANGLE-DELX
3840 DELX   = .1*DELX
3850 IF DEC  < DELX THEN GOTO 3810
```

```
3860 'CONTINUE
3870 ANS      = ANGLE
3880 RETURN
10000 ' SUBROUTINE CHI MACHINE PROGRAM - PROCESS *** A ***
10010 PRINT#3,           "G69       CONTOUR HARDENING,INC."
10020 PRINT#3,           "G69       7898 ZIONSVILLE RD"
10030 PRINT#3,           "G69       INDIANAPOLIS, INDIANA 46268"
10040 PRINT#3,           "G69"
10050 PRINT#3,           "G69       MICROPULSE TM"
10060 PRINT#3,           "G69       ANO III SYSTEM S/N 2603"
10070 PRINT#3,           "G69"
10080 PRINT#3, USING "G69       CUSTOMER..........\
      \";CUST$
10090 PRINT#3, USING "G69       PART NUMBER .......\             \";PART$
10100 PRINT#3, USING "G69       DATE...............\             \";DAT$
10110 PRINT#3, USING "G69       PROGRAM NAME.......\             \";PNAME$
10120 PRINT#3,           "G69            COMMENTS"
10130 PRINT#3,           "G69"
10140 PRINT#3,           "G69"
10150 PRINT#3,           "G69   PROCESS *** A ***"
10151 PRINT#3,           "G69     1. PRE HEAT    (L.F.)"
10152 PRINT#3,           "G69     2. FINAL HEAT (R.F.)"
10153 PRINT#3,           "G69     3. QUENCH"
10154 PRINT#3,           "G69     4. TEMPER     (L.F.)"
10155 PRINT#3, USING "G69     \                          \";B$
10160 PRINT#3,           "G69   SET BOTH L.F. AND R.F. POT SWITCHES TO MANUAL"
10170 PRINT#3,           "G69   L.F. CAPACITANCE ="
10180 PRINT#3,           "G69   L.F. RATIO       ="
10190 PRINT#3, USING "G69   R.F.             = ####.#";V21
10200 PRINT#3, USING "G69 TOTAL CYCLE TIME ............... ####.##";TOTALTIME
10210 PRINT#3, USING "G69 CURRENT DENSITY (KW/IN SQ)...... ####.##";C
10220 PRINT#3, USING "G69 FREQUENCY RF (KHZ) ............. ####.##";KHZ
10230 PRINT#3, USING "G69 SURFACE AREA (SQ INS) .......... ####.##";AREA
10240 PRINT#3,          "G69 ****************************************************"
10250 PRINT#3,          "M1"
10260 PRINT#3,          "G69               VARIABLES"
10261 IF CODE2>0 THEN GOTO 10280
10270 PRINT#3, USING "V1=###.###       G69 Y CLAMP";V1
10280 PRINT#3, USING "V2=###.###       G69 X PREHEAT";V2
10290 PRINT#3, USING "V3=###.###       G69 X FINAL HEAT";V3
10300 PRINT#3, USING "V4=###.###       G69 X QUENCH";V4
10310 PRINT#3, USING "V5=###.###       G69 X TEMPER";V5
10320 PRINT#3, USING "V10=####.##      G69 RPM PREHEAT,    RPM= ###.#";V10,RPMPH
10330 PRINT#3, USING "V11=####.##      G69 RPM FINAL HEAT,RPM= ###.#";V11,RPMFH
10340 PRINT#3, USING "V12=####.##      G69 RPM QUENCH,     RPM= ###.#";V12,RPMQ
10350 PRINT#3, USING "V13=####.##      G69 RPM SPIN DRY,   RPM= ###.#";V13,RPMSD
10360 PRINT#3, USING "V14=####.##      G69 RPM TEMPER,     RPM= ###.#";V14,RPMT
10370 PRINT#3,        "V20= 0.0         G69 POT NO.1  N/A"
10380 PRINT#3,        "V21= 0.0         G69 POT NO.2  N/A"
10390 PRINT#3,        "V22= 0.0         G69 POT NO.3  N/A"
10900 PRINT#3,        "G69 READ QUENCH PRESSURE"
10910 PRINT#3,        "G69 READ QUENCH TEMPERATURE"
10920 PRINT#3,        "KN50            G69 GO TO SUBROUTINE TIMER"
10930 PRINT#3,        "M107            G69 QUENCH OFF"
10940 PRINT#3,        "G69 CHECK QUENCH PRESSURE VS PRE SET LIMITS"
10950 PRINT#3,        "G69 CHECK QUENCH TEMPERATURE VS PRE SET LIMITS"
10960 PRINT#3,        "S 0 2007        G69 STOP ROTATION"
10970 PRINT#3,        "V99=V34         G69 SET VARIABLE V99 (SPIN DRY TIME)"
```

```
10980 PRINT#3,         "S 0 V13              G69 SPIN DRY"
10990 PRINT#3,         "KN50                 G69 GO TO SUBROUTINE TIMER"
11000 PRINT#3,         "FXV44                G69 FEED RATE TO TEMPER"
11010 PRINT#3,         "S 0 V14              G69 RPM TEMPER"
11020 PRINT#3,         "XV5                  G69 X TEMPER"
11030 PRINT#3,         "G5                   G69 WAIT FOR READY"
11040 PRINT#3,         "V99=V35              G69 SET VARIABLE V99 (TEMPER TIME)"
11050 PRINT#3,         "M108                 G69 A.F. ON"
11060 PRINT#3,         "KN50                 G69 GO TO SUBROUTINE TIMER"
11070 PRINT#3,         "G69 READ TEMPER TEMPERATURE"
11080 PRINT#3,         "M109                 G69 TEMPER OFF"
11090 PRINT#3,         "G69 CHECK TEMPER TEMPERATURE VS PRE SET LIMITS"
11100 PRINT#3,         "FX3000               G69 FEED RATE TO X ZERO"
11110 PRINT#3,         "X0                   G69 X TO ZERO"
11120 PRINT#3,         "S 0 2007             G69 STOP ROTATION"
11121 IF CODE2>0 THEN GOTO 11160
11130 PRINT#3,         "G54";CHR$(34);"                       UNCLAMP";CHR$(34)
11140 PRINT#3,         "N150 1-M233 N150"
11150 PRINT#3,         "Y0                   G69 Y TO ZERO"
11160 PRINT#3,         "JN105                G69 LOOP"
11170 PRINT#3,         "M2                   G69 END"
11180 PRINT#3,         "G69 ****************************************************"
11190 PRINT#3,         "G69 ****************************************************"
11200 PRINT#3,         "N50                  G69 SUBROUTINE TIMER"
11210 PRINT#3,         "N130                 G54             ";CHR$(34);" ON FOR"
;CHR$(34);"V99F3.0";CHR$(34);" SECONDS";CHR$(34)
11220 PRINT#3,         "G4X.90"
11230 PRINT#3,         "V99=V99-1            G69 COUNT DOWN"
11240 PRINT#3,         "JV99N130             G69 POSITIVE JUMP TO 130"
11250 PRINT#3,         "G54"
11260 PRINT#3,         "M6                   G69 END SUBROUTINE"
11270 RETURN
12000 ' SUBROUTINE CHI MACHINE PROGRAM - PROCESS *** B ***
12010 PRINT#3,         "G69          CONTOUR HARDENING,INC."
12020 PRINT#3,         "G69          7898 ZIONSVILLE RD"
12030 PRINT#3,         "G69          INDIANAPOLIS, INDIANA 46268"
12040 PRINT#3,         "G69"
12050 PRINT#3,         "G69          MICROPULSE TM"
12060 PRINT#3,         "G69          ANO III SYSTEM S/N 2603"
12070 PRINT#3,         "G69"
12080 PRINT#3, USING "G69          CUSTOMER..........\
      \";CUST$
12090 PRINT#3, USING "G69          PART NUMBER .......\            \";PART$
12100 PRINT#3, USING "G69          DATE...............\            \";DAT$
12110 PRINT#3, USING "G69          PROGRAM NAME.......\            \";PNAME$
12120 PRINT#3,         "G69              COMMENTS"
12130 PRINT#3,         "G69"
12140 PRINT#3,         "G69"
12150 PRINT#3,         "G69   PROCESS *** B ***"
12151 PRINT#3,         "G69     1. PRE HEAT   (R.F. PULSE)"
12152 PRINT#3,         "G69     2. FINAL HEAT (R.F.)"
12153 PRINT#3,         "G69     3. QUENCH"
12154 PRINT#3,         "G69     4. TEMPER     (L.F.)
12155 PRINT#3, USING "G69   \                 ";B$
12160 PRINT#3,         "G69  SET L.F. POT TO MANUAL, SET R.F. POT TO AUTO"
12170 PRINT#3,         "G69  L.F. CAPACITANCE="
12180 PRINT#3,         "G69  L.F. RATIO     ="
12190 PRINT#3, USING "G69  R.F. POT 1     =       PRE HEAT"
12191 PRINT#3,         "G69  R.F. POT 2     = ###.#";V21
12200 PRINT#3, USING "G69 TOTAL CYCLE TIME ............... ####.##";TOTALTIME
12210 PRINT#3, USING "G69 CURRENT DENSITY (KW/IN SQ)...... ####.##";C
```

```
12220 PRINT#3, USING "G69 FREQUENCY    (KHZ) ............ ####.##";KHZ
12230 PRINT#3, USING "G69 SURFACE AREA (SQ INS) .......... ####.##";AREA
12240 PRINT#3,       "G69 ****************************************************"
12250 PRINT#3,       "M1"
12260 PRINT#3,       "G69                VARIABLES"
12261 IF CODE2>0 THEN GOTO 12280
12270 PRINT#3, USING "V1=###.###         G69 Y CLAMP";V1
12280 PRINT#3, USING "V2=###.###         G69 X PREHEAT";V2
12290 PRINT#3, USING "V3=###.###         G69 X FINAL HEAT";V3
12300 PRINT#3, USING "V4=###.###         G69 X QUENCH";V4
12310 PRINT#3, USING "V5=###.###         G69 X TEMPER";V5
12311 PRINT#3,       "V6=5.0000          G69 NO. OF R.F. PRE HEAT PULSES"
12320 PRINT#3, USING "V10=####.##        G69 RPM PREHEAT,    RPM= ###.#";V10,RPMPH
12330 PRINT#3, USING "V11=####.##        G69 RPM FINAL HEAT,RPM= ###.#";V11,RPMFH
12340 PRINT#3, USING "V12=####.##        G69 RPM QUENCH,     RPM= ###.#";V12,RPMQ
12350 PRINT#3, USING "V13=####.##        G69 RPM SPIN DRY,   RPM= ###.#";V13,RPMSD
12360 PRINT#3, USING "V14=####.##        G69 RPM TEMPER,     RPM= ###.#";V14,RPMT
12370 PRINT#3,       "V20= 0.0           G69 POT NO.1 = "
12380 PRINT#3, USING "V21=####.##        G69 POT NO.2 = ####.##";V21
12390 PRINT#3,       "V22= 0.0           G69 POT NO.3  N/A"
12400 PRINT#3, USING "V30=##.###         G69 TIME R.F. PRE HEAT PULSE";V30
12410 PRINT#3, USING "V31=##.###         G69 TIME DWELL AFTER PRE HEAT";V31
12420 PRINT#3, USING "V32=##.###         G69 TIME FINAL HEAT";V32
12430 PRINT#3, USING "V33=##.###         G69 TIME QUENCH";V33
12440 PRINT#3, USING "V34=##.###         G69 TIME SPIN DRY";V34
12450 PRINT#3, USING "V35=##.###         G69 TIME TEMPER";V35
12460 PRINT#3, USING "V40=####.##        G69 FEED RATE Y CLAMP";V40
12470 PRINT#3, USING "V41=####.##        G69 FEED RATE X PRE HEAT";V41
12480 PRINT#3, USING "V42=####.##        G69 FEED RATE X FINAL HEAT";V42
12490 PRINT#3, USING "V43=####.##        G69 FEED RATE X QUENCH";V43
12500 PRINT#3, USING "V44=####.##        G69 FEED RATE X TEMPER";V44
12510 PRINT#3,       "G69 ****************************************************"
12520 PRINT#3,       "N105 G69 LABEL:LOOP"
12530 PRINT#3,       "G70G90S1 0S2 0"
12540 PRINT#3,       "M101M102M104M107M109M111M113M115"
12541 IF CODE2>0 THEN GOTO 12580
12550 PRINT#3,       "G54";CHR$(34);"                    CLAMP";CHR$(34)
12560 PRINT#3,       "N106 1-M232 N106"
12570 PRINT#3,       "YV1"
12580 PRINT#3,       "G54";CHR$(34);"                    START CYCLE  DEPRESS NO. 1 AND NO. 2";CHR$(34)
12590 PRINT#3,       "N108JM237+M238N110"
12600 PRINT#3,       "JN108"
12610 PRINT#3,       "N110J2-(M237+M238)N110"
12620 PRINT#3,       "N120JM237+M238N120"
12630 PRINT#3,       "G54";CHR$(34);"                    START CYCLE............";CHR$(34)
12640 PRINT#3,       "FXV41              G69 FEED RATE TO PRE HEAT"
12650 PRINT#3,       "S 0 V10            G69 RPM PRE HEAT"
12660 PRINT#3,       "XV2                G69 X PRE HEAT"
12665 PRINT#3,       "M110               G69 POT NO. 1 ON"
12670 PRINT#3,       "G5                 G69 WAIT FOR READY"
12680 FOR I=1 TO V6
12690 PRINT#3,       "M100               G69 R.F. ON"
12700 PRINT#3,       "G4XV30             G69 ON FOR V30 SECONDS"
12701 PRINT#3,       "M101               G69 R.F. OFF"
12702 PRINT#3,       "G4XV31             G69 DWELL FOR V31 SECONDS"
12703 NEXT I
```

```
12704 PRINT#3,      "M111              G69 POT NO. OFF"
12710 PRINT#3,      "G69 READ PRE HEAT TEMPERATURE"
12730 PRINT#3,      "G69 CHECK TEMPERATURE VS PRE SET LIMITS"
12740 PRINT#3,      "G4XV31            G69 DWELL FOR V31 SECONDS"
12750 PRINT#3,      "FXV42             G69 FEED RATE TO FINAL HEAT"
12760 PRINT#3,      "XV3               G69 X FINAL HEAT"
12770 PRINT#3,      "FXV43             G69 FEED RATE TO QUENCH"
12775 PRINT#3,      "M112              G69 POT NO. 2 ON"
12780 PRINT#3,      "G5                G69 WAIT FOR READY"
12790 PRINT#3,      "M100              G69 R.F. ON"
12800 PRINT#3,      "G4XV32            G69 ON FOR V32 SECONDS"
12810 PRINT#3,      "G69 READ FINAL HEAT TEMPERATURE"
12820 PRINT#3,      "G69 READ ENERAGY MONITOR"
12830 PRINT#3,      "M101              G69 R.F. OFF"
12840 PRINT#3,      "G69 CHECK TEMPERATURE VS PRE SET LIMITS"
12850 PRINT#3,      "G69 CHECK ENERGY MONITOR VS PRE SET LIMITS"
12860 PRINT#3,      "S 0 V12           G69 RPM QUENCH"
12870 PRINT#3,      "XV4               G69 X QUENCH"
12880 PRINT#3,      "V99=V33           G69 SET VARIABLE V99 (QUENCH TIME)"
12890 PRINT#3,      "M106              G69 QUENCH ON"
12900 PRINT#3,      "G69 READ QUENCH PRESSURE"
12910 PRINT#3,      "G69 READ QUENCH TEMPERATURE"
12920 PRINT#3,      "KN50              G69 GO TO SUBROUNINE TIMER"
12930 PRINT#3,      "M107              G69 QUENCH OFF"
12940 PRINT#3,      "G69 CHECK QUENCH PRESSURE VS PRE SET LIMITS"
12950 PRINT#3,      "G69 CHECK QUENCH TEMPERATURE VS PRE SET LIMITS"
12960 PRINT#3,      "S 0 2007          G69 STOP ROTATION"
12970 PRINT#3,      "V99=V34           G69 SET VARIABLE V99 (SPIN DRY TIME)"
12980 PRINT#3,      "S 0 V13           G69 SPIN DRY"
12990 PRINT#3,      "KN50              G69 GO TO SUBROUTINE TIMER"
13000 PRINT#3,      "FXV44             G69 FEED RATE TO TEMPER"
13010 PRINT#3,      "S 0 V14           G69 RPM TEMPER"
13020 PRINT#3,      "XV5               G69 X TEMPER"
13030 PRINT#3,      "G5                G69 WAIT FOR READY"
13040 PRINT#3,      "V99=V35           G69 SET VARIABLE V99 (TEMPER TIME)"
13050 PRINT#3,      "M108              G69 L.F. ON"
13060 PRINT#3,      "KN50              G69 GO TO SUBROUTINE TIMER"
13070 PRINT#3,      "G69 READ TEMPER TEMPERATURE"
13080 PRINT#3,      "M109              G69 TEMPER OFF"
13090 PRINT#3,      "G69 CHECK TEMPER TEMPERATURE VS PRE SET LIMITS"
13100 PRINT#3,      "FX3000            G69 FEED RATE TO X ZERO"
13110 PRINT#3,      "X0                G69 X TO ZERO"
13120 PRINT#3,      "S 0 2007          G69 STOP ROTATION"
13121 IF CODE2>0 THEN GOTO 13160
13130 PRINT#3,      "G54";CHR$(34);"                    UNCLAMP";CHR$(34)
13140 PRINT#3,      "N150 1-M233 N150"
13150 PRINT#3,      "Y0                G69 Y TO ZERO"
13160 PRINT#3,      "JN105             G69 LOOP"
13170 PRINT#3,      "M2                G69 END"
13180 PRINT#3,      "G69 *******************************************"
13190 PRINT#3,      "G69 *******************************************"
13200 PRINT#3,      "N50               G69 SUBROUTINE TIMER"
13210 PRINT#3,      "N130              G54            ";CHR$(34);" ON FOR";CHR$(34);"V99F3.0";CHR$(34);" SECONDS";CHR$(34)
13220 PRINT#3,      "G4X.90"
13230 PRINT#3,      "V99=V99-1         G69 COUNT DOWN"
13240 PRINT#3,      "JV99N130          G69 POSITIVE JUMP TO 130"
13250 PRINT#3,      "G54"
13260 PRINT#3,      "M6                G69 END SUBROUTINE"
13270 RETURN
```

```
14000 ' SUBROUTINE CHI MACHINE PROGRAM - PROCESS *** C ***
14010 PRINT#3,          "G69      CONTOUR HARDENING,INC."
14020 PRINT#3,          "G69      7898 ZIONSVILLE RD"
14030 PRINT#3,          "G69      INDIANAPOLIS, INDIANA 46268"
14040 PRINT#3,          "G69"
14050 PRINT#3,          "G69      MICROPULSE TM"
14060 PRINT#3,          "G69      ANO III SYSTEM S/N 2603"
14070 PRINT#3,          "G69"
14080 PRINT#3, USING "G69      CUSTOMER..........\
      \";CUST$
14090 PRINT#3, USING "G69      PART NUMBER .......\            \";PART$
14100 PRINT#3, USING "G69      DATE...............\            \";DAT$
14110 PRINT#3, USING "G69      PROGRAM NAME.......\            \";PNAME$
14120 PRINT#3,          "G69            COMMENTS"
14130 PRINT#3,          "G69"
14140 PRINT#3,          "G69"
14150 PRINT#3,          "G69      PROCESS *** C ***"
14151 PRINT#3,          "G69      1. PRE HEAT    (R.F. PULSE)"
14152 PRINT#3,          "G69      2. FINAL HEAT  (R.F.)"
14153 PRINT#3,          "G69      3. QUENCH"
14154 PRINT#3,          "G69      4. TEMPER      (R.F. PULSE)"
14155 PRINT#3, USING "G69      \                   \";B$
14160 PRINT#3,          "G69      L.F. N/A, SET R.F. POT SWITCH TO AUTO"
14170 PRINT#3,          "G69      SET POTS
14180 PRINT#3,          "G69      POT 1= "
14190 PRINT#3, USING "G69      POT 2= ####.#";V21
14191 PRINT#3,          "G69      POT 3= "
14200 PRINT#3, USING "G69 TOTAL CYCLE TIME ............... ####.##";TOTALTIME
14210 PRINT#3, USING "G69 CURRENT DENSITY (KW/IN SQ)...... ####.##";C
14220 PRINT#3, USING "G69 FREQUENCY RF (KHZ) ............. ####.##";KHZ
14230 PRINT#3, USING "G69 SURFACE AREA (SQ INS) .......... ####.##";AREA
14240 PRINT#3,          "G69 ***************************************************"
14250 PRINT#3,          "M1"
14260 PRINT#3,          "G69              VARIABLES"
14261 IF CODE2>0 THEN GOTO 14280
14270 PRINT#3, USING "V1=###.###         G69 Y CLAMP";V1
14280 PRINT#3, USING "V2=###.###         G69 X PREHEAT";V2
14290 PRINT#3, USING "V3=###.###         G69 X FINAL HEAT";V3
14300 PRINT#3, USING "V4=###.###         G69 X QUENCH";V4
14310 PRINT#3, USING "V5=###.###         G69 X TEMPER";V5
14311 PRINT#3,         "V6=5.0000         G69 NO. OF R.F. PRE HEAT PULSES"
14312 PRINT#3,         "V7=5.0000         G69 NO. OF R.F. TEMPER PULSES"
14320 PRINT#3, USING "V10=####.##        G69 RPM PREHEAT,   RPM= ###.#";V10,RPMPH
14330 PRINT#3, USING "V11=####.##        G69 RPM FINAL HEAT,RPM= ###.#";V11,RPMFH
14340 PRINT#3, USING "V12=####.##        G69 RPM QUENCH,    RPM= ###.#";V12,RPMQ
14350 PRINT#3, USING "V13=####.##        G69 RPM SPIN DRY,  RPM= ###.#";V13,RPMSD
14360 PRINT#3, USING "V14=####.##        G69 RPM TEMPER,    RPM= ###.#";V14,RPMT
14370 PRINT#3,         "V20= 0.0          G69 POT NO.1"
14380 PRINT#3, USING "V21=####.##        G69 POT NO.2";V21
14390 PRINT#3,         "V22= 0.0          G69 POT NO.3"
14400 PRINT#3, USING "V30=##.###         G69 TIME R.F. PRE HEAT PULSES";V30
14410 PRINT#3, USING "V31=##.###         G69 TIME DWELL AFTER PRE HEAT";V31
14420 PRINT#3, USING "V32=##.###         G69 TIME FINAL HEAT";V32
14430 PRINT#3, USING "V33=##.###         G69 TIME QUENCH";V33
14440 PRINT#3, USING "V34=##.###         G69 TIME SPIN DRY";V34
14450 PRINT#3, USING "V35=##.###         G69 TIME R.F.TEMPER PULSES";V35
14455 PRINT#3, USING "V36=##.###         G69 TIME DWELL BETWEEN R.F. TEMPER";V36
14456 PRINT#3, USING "V37=##.###         G69 TIME DWELL BETWEEN PRE HEAT PULSES";V37
```

```
14460 PRINT#3, USING "V40=####.##       G69 FEED RATE Y CLAMP";V40
14470 PRINT#3, USING "V41=####.##       G69 FEED RATE X PRE HEAT";V41
14480 PRINT#3, USING "V42=####.##       G69 FEED RATE X FINAL HEAT";V42
14490 PRINT#3, USING "V43=####.##       G69 FEED RATE X QUENCH";V43
14500 PRINT#3, USING "V44=####.##       G69 FEED RATE X TEMPER";V44
14510 PRINT#3,      "G69 *****************************************************"
14520 PRINT#3,      "N105 G69 LABEL:LOOP"
14530 PRINT#3,      "G70G90S1 0S2 0"
14540 PRINT#3,      "M101M102M104M107M109M111M113M115"
14541 IF CODE2>0 THEN GOTO 14580
14550 PRINT#3,      "G54";CHR$(34);"                      CLAMP";CHR$(34)
14560 PRINT#3,      "N106 1-M232 N106"
14570 PRINT#3,      "YV1"
14580 PRINT#3,      "G54";CHR$(34);"                      START CYCLE   DEPRESS NO
. 1 AND NO. 2";CHR$(34)
14590 PRINT#3,      "N108JM237+M238N110"
14600 PRINT#3,      "JN108"
14610 PRINT#3,      "N110J2-(M237+M238)N110"
14620 PRINT#3,      "N120JM237+M238N120"
14630 PRINT#3,      "G54";CHR$(34);"                      START CYCLE..........
......";CHR$(34)
14640 PRINT#3,      "FXV41            G69 FEED RATE TO PRE HEAT"
14650 PRINT#3,      "S 0 V10          G69 RPM PRE HEAT"
14660 PRINT#3,      "XV2              G69 X PRE HEAT"
14665 PRINT#3,      "M110             G69 POT NO. 1 ON"
14670 PRINT#3,      "G5               G69 WAIT FOR READY"
14680 FOR I=1 TO V6
14690 PRINT#3,      "M100             G69 R.F. ON"
14700 PRINT#3,      "G4XV30           G69 ON FOR V30 SECONDS"
14701 PRINT#3,      "M101             G69 R.F. OFF"
14702 PRINT#3,      "G4XV37           G69 DWELL FOR V37 SECONDS"
14703 NEXT I
14704 PRINT#3,      "M111             G69 POT NO. 1 OFF"
14710 PRINT#3,      "G69 READ PRE HEAT TEMPERATURE"
14730 PRINT#3,      "G69 CHECK TEMPERATURE VS PRE SET LIMITS"
14740 PRINT#3,      "G4XV31           G69 DWELL FOR V31 SECONDS"
14750 PRINT#3,      "FXV42            G69 FEED RATE TO FINAL HEAT"
14760 PRINT#3,      "XV3              G69 X FINAL HEAT"
14770 PRINT#3,      "FXV43            G69 FEED RATE TO QUENCH"
14775 PRINT#3,      "M112             G69 POT NO. 2 ON"
14780 PRINT#3,      "G5               G69 WAIT FOR READY"
14790 PRINT#3,      "M100             G69 R.F. ON"
14800 PRINT#3,      "G4XV32           G69 ON FOR V32 SECONDS"
14810 PRINT#3,      "G69 READ FINAL HEAT TEMPERATURE"
14820 PRINT#3,      "G69 READ ENERAGY MONITOR"
14830 PRINT#3,      "M101             G69 R.F. OFF"
14840 PRINT#3,      "G69 CHECK TEMPERATURE VS PRE SET LIMITS"
14850 PRINT#3,      "G69 CHECK ENERGY MONITOR VS PRE SET LIMITS"
14855 PRINT#3,      "M113             G69 POT NO. 2 OFF"
14860 PRINT#3,      "S 0 V12          G69 RPM QUENCH"
14870 PRINT#3,      "XV4              G69 X QUENCH"
14880 PRINT#3,      "V99=V33          G69 SET VARIABLE V99 (QUENCH TIME)"
14890 PRINT#3,      "M106             G69 QUENCH ON"
14900 PRINT#3,      "G69 READ QUENCH PRESSURE"
14910 PRINT#3,      "G69 READ QUENCH TEMPERATURE"
14920 PRINT#3,      "KN50             G69 GO TO SUBROUNINE TIMER"
14930 PRINT#3,      "M107             G69 QUENCH OFF"
14940 PRINT#3,      "G69 CHECK QUENCH PRESSURE VS PRE SET LIMITS"
14950 PRINT#3,      "G69 CHECK QUENCH TEMPERATURE VS PRE SET LIMITS"
14960 PRINT#3,      "S 0 2007         G69 STOP ROTATION"
14970 PRINT#3,      "V99=V34          G69 SET VARIABLE V99 (SPIN DRY TIME)"
```

```
14980 PRINT#3,       "S O V13           G69 SPIN DRY"
14990 PRINT#3,       "KN50              G69 GO TO SUBROUTINE TIMER"
15000 PRINT#3,       "FXV44             G69 FEED RATE TO TEMPER"
15010 PRINT#3,       "S O V14           G69 RPM TEMPER"
15020 PRINT#3,       "XV5               G69 X TEMPER"
15025 PRINT#3,       "M114              G69 POT NO. 3 ON"
15030 PRINT#3,       "G5                G69 WAIT FOR READY"
15040 FOR I=1 TO V7
15050 PRINT#3,       "M100              G69 R.F. ON"
15060 PRINT#3,       "G4XV35            G69 ON FOR V35 SECONDS"
15061 PRINT#3,       "M101              G69 R.F. OFF"
15062 PRINT#3,       "G4XV36            G69 DWELL FOR V36 SECONDS"
15063 NEXT I
15070 PRINT#3,       "G69 READ TEMPER TEMPERATURE"
15090 PRINT#3,       "G69 CHECK TEMPER TEMPERATURE VS PRE SET LIMITS"
15095 PRINT#3,       "M115              G69 POT NO. 3 OFF"
15100 PRINT#3,       "FX3000            G69 FEED RATE TO X ZERO"
15110 PRINT#3,       "X0                G69 X TO ZERO"
15120 PRINT#3,       "S O 2007          G69 STOP ROTATION"
15121 IF CODE2>0 THEN GOTO 15160
15130 PRINT#3,       "G54";CHR$(34);"              UNCLAMP";CHR$(34)
15140 PRINT#3,       "N150 1-M233 N150"
15150 PRINT#3,       "Y0                G69 Y TO ZERO"
15160 PRINT#3,       "JN105             G69 LOOP"
15170 PRINT#3,       "M2                G69 END"
15180 PRINT#3,       "G69 ****************************************************"
15190 PRINT#3,       "G69 ****************************************************"
15200 PRINT#3,       "N50               G69 SUBROUTINE TIMER"
15210 PRINT#3,       "N130              G54              ";CHR$(34);" ON FOR"
;CHR$(34);"V99F3.0";CHR$(34);" SECONDS";CHR$(34)
15220 PRINT#3,       "G4X.90"
15230 PRINT#3,       "V99=V99-1         G69 COUNT DOWN"
15240 PRINT#3,       "JV99N130          G69 POSITIVE JUMP TO 130"
15250 PRINT#3,       "G54"
15260 PRINT#3,       "M6                G69 END SUBROUTINE"
15270 RETURN
16000 ' SUBROUTINE CHI MACHINE PROGRAM - PROCESS *** D ***
16010 PRINT#3,       "G69       CONTOUR HARDENING,INC."
16020 PRINT#3,       "G69       7898 ZIONSVILLE RD"
16030 PRINT#3,       "G69       INDIANAPOLIS, INDIANA 46268"
16040 PRINT#3,       "G69"
16050 PRINT#3,       "G69       MICROPULSE TM"
16060 PRINT#3,       "G69       ANO III SYSTEM S/N 2603"
16070 PRINT#3,       "G69"
16080 PRINT#3, USING "G69       CUSTOMER...:.......\
      \";CUST$
16090 PRINT#3, USING "G69       PART NUMBER .......\         \";PART$
16100 PRINT#3, USING "G69       DATE...............\         \";DAT$
16110 PRINT#3, USING "G69       PROGRAM NAME.......\         \";PNAME$
16120 PRINT#3,       "G69             COMMENTS"
16130 PRINT#3,       "G69"
16140 PRINT#3,       "G69"
16150 PRINT#3,       "G69   PROCESS *** D ***"
16151 PRINT#3,       "G69      1. PRE HEAT     (L.F.)"
16152 PRINT#3,       "G69      2. PRE HEAT     (R.F. PULSE)"
16153 PRINT#3,       "G69      3. FINAL HEAT   (R.F.)"
16154 PRINT#3,       "G69      4. QUENCH"
16155 PRINT#3,       "G69      5. TEMPER       (L.F.)"
16156 PRINT#3, USING "G69   \                   \";B$
16160 PRINT#3,       "G69 SET L.F. TO MANUAL AND R.F. SWITCH TO AUTO"
```

```
16170 PRINT#3,        "G69    SET POTS
16180 PRINT#3,        "G69    L.F. CAPACITANCE="
16181 PRINT#3,        "G69    L.F. RATIO      ="
16182 PRINT#3,        "G69    POT 1           ="
16190 PRINT#3, USING "G69    POT 2           = ####.#";V21
16191 PRINT#3,        "G69    POT 3           = N/A"
16200 PRINT#3, USING "G69 TOTAL CYCLE TIME ............... ####.##";TOTALTIME
16210 PRINT#3, USING "G69 CURRENT DENSITY (KW/IN SQ)...... ####.##";C
16220 PRINT#3, USING "G69 FREQUENCY RF (KHZ) ............. ####.##";KHZ
16230 PRINT#3, USING "G69 SURFACE AREA (SQ INS) .......... ####.##";AREA
16240 PRINT#3,        "G69 *********************************************"
16250 PRINT#3,        "M1"
16260 PRINT#3,        "G69              VARIABLES"
16261 IF CODE2>0 THEN GOTO 16280
16270 PRINT#3, USING "V1=###.###       G69 Y CLAMP";V1
16280 PRINT#3, USING "V2=###.###       G69 X PREHEAT";V2
16290 PRINT#3, USING "V3=###.###       G69 X FINAL HEAT";V3
16300 PRINT#3, USING "V4=###.###       G69 X QUENCH";V4
16310 PRINT#3, USING "V5=###.###       G69 X TEMPER";V5
16315 PRINT#3,        "V6=5.0           G69 NO. OF R.F. PRE HEAT PULSES"
16320 PRINT#3, USING "V10=####.##      G69 RPM PREHEAT,    RPM= ###.#";V10,RPMPH
16330 PRINT#3, USING "V11=####.##      G69 RPM FINAL HEAT,RPM= ###.#";V11,RPMFH
16340 PRINT#3, USING "V12=####.##      G69 RPM QUENCH,     RPM= ###.#";V12,RPMQ
16350 PRINT#3, USING "V13=####.##      G69 RPM SPIN DRY,   RPM= ###.#";V13,RPMSD
16360 PRINT#3, USING "V14=####.##      G69 RPM TEMPER,     RPM= ###.#";V14,RPMT
16370 PRINT#3,        "V20=             G69 POT NO.1"
16380 PRINT#3, USING "V21=####.##      G69 POT NO.2";V21
16390 PRINT#3,        "V22= 0.0         G69 POT NO.3  N/A"
16400 PRINT#3, USING "V30=##.###       G69 TIME L.F.";V30
16410 PRINT#3, USING "V31=##.###       G69 TIME DWELL AFTER L.F. PRE HEAT";V31
16420 PRINT#3, USING "V32=##.###       G69 TIME FINAL HEAT";V32
16430 PRINT#3, USING "V33=##.###       G69 TIME QUENCH";V33
16440 PRINT#3, USING "V34=##.###       G69 TIME SPIN DRY";V34
16450 PRINT#3, USING "V35=##.###       G69 TIME TEMPER";V35
16452 PRINT#3,        "V36=1.0          G69 TIME DWELL BETWEEN R.F. PRE HEAT PULSES"
16454 PRINT#3,        "V37=1.0          G69 TIME R.F. PRE HEAT PULSE"
16456 PRINT#3,        "V38=1.0          G69 TIME AFTER R.F. PRE HEAT PULSES"
16460 PRINT#3, USING "V40=####.##      G69 FEED RATE Y CLAMP";V40
16470 PRINT#3, USING "V41=####.##      G69 FEED RATE X PRE HEAT";V41
16480 PRINT#3, USING "V42=####.##      G69 FEED RATE X FINAL HEAT";V42
16490 PRINT#3, USING "V43=####.##      G69 FEED RATE X QUENCH";V43
16500 PRINT#3, USING "V44=####.##      G69 FEED RATE X TEMPER";V44
16510 PRINT#3,        "G69 *********************************************"
16520 PRINT#3,        "N105 G69 LABEL:LOOP"
16530 PRINT#3,        "G70G90S1 0S2 0"
16540 PRINT#3,        "M101M102M104M107M109M111M113M115"
16541 IF CODE2>0 THEN GOTO 16580
16550 PRINT#3,        "G54";CHR$(34);"                      CLAMP";CHR$(34)
16560 PRINT#3,        "N106 1-M232 N106"
16570 PRINT#3,        "YV1"
16580 PRINT#3,        "G54";CHR$(34);"                      START CYCLE DEPRESS NO. 1 AND NO. 2";CHR$(34)
16590 PRINT#3,        "N108JM237+M238N110"
16600 PRINT#3,        "JN108"
16610 PRINT#3,        "N110J2-(M237+M238)N110"
16620 PRINT#3,        "N120JM237+M238N120"
```

```
16630 PRINT#3,    "G54";CHR$(34);"                        START CYCLE...........
..........";CHR$(34)
16640 PRINT#3,    "FXV41            G69 FEED RATE TO PRE HEAT"
16650 PRINT#3,    "S 0 V10          G69 RPM PRE HEAT"
16660 PRINT#3,    "XV2              G69 X PRE HEAT"
16670 PRINT#3,    "G5               G69 WAIT FOR READY"
16680 PRINT#3,    "V99=V30          G69 SET VARIABLE V99 (L.F. PH TIME)"
16690 PRINT#3,    "M108             G69 L.F. ON"
16700 PRINT#3,    "KN50             G69 GO TO SUBROUTINE TIMER"
16710 PRINT#3,    "G69 READ PRE HEAT TEMPERATURE"
16720 PRINT#3,    "M109             G69 L.F. OFF"
16730 PRINT#3,    "G69 CHECK TEMPERATURE VS PRE SET LIMITS"
16740 PRINT#3,    "G4XV31           G69 DWELL FOR V31 SECONDS"
16750 PRINT#3,    "FXV42            G69 FEED RATE TO FINAL HEAT"
16760 PRINT#3,    "XV3              G69 X FINAL HEAT"
16770 PRINT#3,    "FXV43            G69 FEED RATE TO QUENCH"
16775 PRINT#3,    "M110             G69 POT NO. 1 ON"
16780 PRINT#3,    "G5               G69 WAIT FOR READY"
16781 FOR I=1 TO V6
16782 PRINT#3,    "M100             G69 R.F. ON"
16783 PRINT#3,    "G4XV37           G69 ON FOR V37 SECONDS"
16784 PRINT#3,    "M101             G69 R.F. OFF"
16785 PRINT#3,    "G4XV36           G69 DWELL FOR V36 SECONDS"
16786 NEXT I
16787 PRINT#3,    "M111             G69 POT NO. 1 OFF"
16788 PRINT#3,    "G4XV38           G69 DWELL AFTER R.F. PRE HEAT PULSES"
16790 PRINT#3,    "M100             G69 R.F. ON"
16800 PRINT#3,    "G4XV32           G69 ON FOR V32 SECONDS"
16810 PRINT#3,    "G69 READ FINAL HEAT TEMPERATURE"
16820 PRINT#3,    "G69 READ ENERAGY MONITOR"
16830 PRINT#3,    "M101             G69 R.F. OFF"
16840 PRINT#3,    "G69 CHECK TEMPERATURE VS PRE SET LIMITS"
16850 PRINT#3,    "G69 CHECK ENERGY MONITOR VS PRE SET LIMITS"
16860 PRINT#3,    "S 0 V12          G69 RPM QUENCH"
16870 PRINT#3,    "XV4              G69 X QUENCH"
16880 PRINT#3,    "V99=V33          G69 SET VARIABLE V99 (QUENCH TIME)"
16890 PRINT#3,    "M106             G69 QUENCH ON"
16900 PRINT#3,    "G69 READ QUENCH PRESSURE"
16910 PRINT#3,    "G69 READ QUENCH TEMPERATURE"
16920 PRINT#3,    "KN50             G69 GO TO SUBROUNINE TIMER"
16930 PRINT#3,    "M107             G69 QUENCH OFF"
16940 PRINT#3,    "G69 CHECK QUENCH PRESSURE VS PRE SET LIMITS"
16950 PRINT#3,    "G69 CHECK QUENCH TEMPERATURE VS PRE SET LIMITS"
16960 PRINT#3,    "S 0 2007         G69 STOP ROTATION"
16970 PRINT#3,    "V99=V34          G69 SET VARIABLE V99 (SPIN DRY TIME)"
16980 PRINT#3,    "S 0 V13          G69 SPIN DRY"
16990 PRINT#3,    "KN50             G69 GO TO SUBROUTINE TIMER"
17000 PRINT#3,    "FXV44            G69 FEED RATE TO TEMPER"
17010 PRINT#3,    "S 0 V14          G69 RPM TEMPER"
17020 PRINT#3,    "XV5              G69 X TEMPER"
17030 PRINT#3,    "G5               G69 WAIT FOR READY"
17040 PRINT#3,    "V99=V35          G69 SET VARIABLE V99 (TEMPER TIME)"
17050 PRINT#3,    "M108             G69 A.F. ON"
17060 PRINT#3,    "KN50             G69 GO TO SUBROUTINE TIMER"
17070 PRINT#3,    "G69 READ TEMPER TEMPERATURE"
17080 PRINT#3,    "M109             G69 TEMPER OFF"
17090 PRINT#3,    "G69 CHECK TEMPER TEMPERATURE VS PRE SET LIMITS"
17100 PRINT#3,    "FX3000           G69 FEED RATE TO X ZERO"
17110 PRINT#3,    "X0               G69 X TO ZERO"
17120 PRINT#3,    "S 0 2007         G69 STOP ROTATION"
17121 IF CODE2>0 THEN GOTO 17160
```

```
17130 PRINT#3,     "G54";CHR$(34);"                    UNCLAMP";CHR$(34)
17140 PRINT#3,     "N150 1-M233 N150"
17150 PRINT#3,     "Y0              G69 Y TO ZERO"
17160 PRINT#3,     "JN105           G69 LOOP"
17170 PRINT#3,     "M2              G69 END"
17180 PRINT#3,     "G69 ***************************************************"
17190 PRINT#3,     "G69 ***************************************************"
17200 PRINT#3,     "N50             G69 SUBROUTINE TIMER"
17210 PRINT#3,     "N130            G54                 ";CHR$(34);" ON FOR"
;CHR$(34);"V99F3.0";CHR$(34);" SECONDS";CHR$(34)
17220 PRINT#3,     "G4X.90"
17230 PRINT#3,     "V99=V99-1       G69 COUNT DOWN"
17240 PRINT#3,     "JV99N130        G69 POSITIVE JUMP TO 130"
17250 PRINT#3,     "G54"
17260 PRINT#3,     "M6              G69 END SUBROUTINE"
17270 RETURN
```

LISTING B

CONTOUR HARDENING, INC.
        7898 ZIONSVILLE ROAD
        INDIANAPOLIS, INDIANA 46268

COIL DESIGN/ADAPTIVE CONTROL ½ JUNE 1987

MICROPLUSE   TM

I N P U T   D A T A

```
CUSTOMER ..................... XYZ COMPANY
PART NUMBER .................. 1234567
DATE ......................... 11/23/87
PROGRAM NAME ................. FILE1.NC

NUMBER OF TEETH ..............      72
DIAMETRAL PITCH ..............   8.0000
PRESSURE ANGLE (Normal) ......  20.0000
OUTSIDE DIAMETER,max .........  10.0000
ROOT DIAMETER,min ............   9.4120
ROOT FILLET RADIUS ...........   0.038
ARC TOOTH THICKNESS(normal) ..   0.1913
FACE WIDTH,max ...............   1.3200
HELIX ANGLE,HAND .............  22.6197,RH
MEASURING PIN or BALL DIA ....   0.2160
GEAR TYPE .................... EXTERNAL
COIL TO PART AIR GAP / SIDE ..   0.1100
MATERIAL CODE ................      0
CODE 1 (PROCESS) ............. PROCESS A
CODE 2 (MOUNTING) ............ BETWEEN CENTERS
```

........ GEAR DATA ........

```
PITCH DIA ....................   9.749989
BASE CIRCLE DIA ..............   9.070354
TRANSVERSE PRESSURE ANGLE ....  21.519350
TRANSVERSE DIAMETRAL PITCH ...   7.384623
ARC T at OD/ID (Normal) ......   0.0954
LEAD .........................  73.513700
```

```
 BASE HELIX ANGLE .............  21.187310
 MEASUREMENT OVER/BETWEEN ......  10.0423

1/3 FACE WIDTH ........  0.440
 SURFACE AREA ..........  75.747 Sq in
 CIRCUMFERENCE AT OD ...  31.416

........ COIL DATA ........

JOB NUMBER ....................
 PART NUMBER/CUSTOMER ..........1234567

DIMENSION -A- COPPER          COIL ANGLE                COIL DIAMETER (flat)
 (inches) (MATRIX SELECTION)(degrees)  (deg min  sec)    ID/EXT  ,  OD/INT 0.1875    ( 3/16 )        6.3233    6  19  23.77       10.283
    0.2500    ( 1/ 4 )        5.9769    5  58  36.85       10.276
    0.3125    ( 5/16 )        5.6301    5  37  48.35       10.270
    0.3750    ( 3/ 8 )        5.2829    5  16  58.35       10.264
    0.5000    ( 1/ 2 )        4.5873    4  35  14.25       10.253
    0.6250    ( 5/ 8 )        3.8903    3  53  25.25       10.244
    0.7500    ( 3/ 4 )        3.1922    3  11  32.10       10.236
    0.8750    ( 7/ 8 )        2.4932    2  29  35.53       10.230
    1.0000    ( 1/ 1 )        1.7934    1  47  36.28       10.225

DIMENSIONS FOR P/N 6800006 (COIL ASSY, RF)

DIA A ............ 10.220
         DIA B ............ 10.000
         DIM C ............  1.320
         DIM D ............  0.375

DIMENSIONS FOR P/N 6800003 (COIL ASSY, LF)

DIM A ............ 10.220
         DIA B ............ 10.000
         DIM C ............  1.320
         DIM D ............  0.375
         DIM R ............  2.555
         DIM X ............  2.555
         DIM Y ............  5.110

G69 LISTING C
 G69       CONTOUR HARDENING,INC.
 G69       7898 ZIONSVILLE RD
 G69       INDIANAPOLIS, INDIANA 46268
 G69
 G69       MICROPULSE TM
 G69       ANO III SYSTEM S/N 2603
 G69
 G69       CUSTOMER...........XYZ COMPANY
 G69       PART NUMBER .......1234567
 G69       DATE...............11/23/87
 G69       PROGRAM NAME.......FILE1.NC
 G69              COMMENTS
 G69
 G69
```

```
G69   PROCESS *** A ***
G69     1. PRE HEAT    (L.F.)
G69     2. FINAL HEAT  (R.F.)
G69     3. QUENCH
G69     4. TEMPER      (L.F.)
G69     BETWEEN CENTERS
G69   SET BOTH L.F. AND R.F. POT SWITCHES TO MANUAL
G69   L.F. CAPACITANCE =
G69   L.F. RATIO       =
G69   R.F.             =   94.1
G69  TOTAL CYCLE TIME ................ 104.21
G69  CURRENT DENSITY (KW/IN SQ).......   9.00
G69  FREQUENCY RF (KHZ) ..............  150.00
G69  SURFACE AREA (SQ INS) ...........   75.75
G69  ********************************************
M1
G69              VARIABLES
V1=   5.000         G69 Y CLAMP
V2=   5.000         G69 X PREHEAT
V3=  10.000         G69 X FINAL HEAT
V4=  15.000         G69 X QUENCH
V5=   5.000         G69 X TEMPER
V10=3500.00         G69 RPM PREHEAT,    RPM= 450.0
V11=4000.00         G69 RPM FINAL HEAT, RPM= 600.0
V12=2016.67         G69 RPM QUENCH,     RPM=   5.0
V13=2000.00         G69 RPM SPIN DRY,   RPM=   0.0
V14=3500.00         G69 RPM TEMPER,     RPM= 450.0
V20=  0.0           G69 POT NO.1  N/A
V21=  0.0           G69 POT NO.2  N/A
V22=  0.0           G69 POT NO.3  N/A
V30=42.000          G69 TIME L.F.
V31= 1.000          G69 TIME DWELL AFTER PRE HEAT
V32= 0.707          G69 TIME FINAL HEAT
V33=36.500          G69 TIME QUENCH
V34= 3.000          G69 TIME SPIN DRY
V35=21.000          G69 TIME TEMPER
V40=3000.00         G69 FEED RATE Y CLAMP
V41=1500.00         G69 FEED RATE X PRE HEAT
V42=4000.00         G69 FEED RATE X FINAL HEAT
V43=4000.00         G69 FEED RATE X QUENCH
V44=2500.00         G69 FEED RATE X TEMPER
G69 ********************************************
N105 G69 LABEL:LOOP
G70G90S1 0S2 0
M101M102M104M107M109M111M113M115
G54"                     CLAMP"
N106 1-M232 N106
YV1
G54"                     START CYCLE  DEPRESS NO. 1 AND NO. 2"
N108JM237+M238N110
JN108
N110J2-(M237+M238)N110
N120JM237+M238N120
G54"                     START CYCLE...................."
FXV41               G69 FEED RATE TO PRE HEAT
S 0 V10             G69 RPM PRE HEAT
XV2                 G69 X PRE HEAT
G5                  G69 WAIT FOR READY
V99=V30             G69 SET VARIABLE V99 (L.F. PH TIME)
M108                G69 L.F. ON
KN50                G69 GO TO SUBROUTINE TIMER
```

```
                    G69 READ PRE HEAT TEMPERATURE
M109                G69 L.F. OFF
                    G69 CHECK TEMPERATURE VS PRE SET LIMITS
G4XV31              G69 DWELL FOR V31 SECONDS
FXV42               G69 FEED RATE TO FINAL HEAT
XV3                 G69 X FINAL HEAT
FXV43               G69 FEED RATE TO QUENCH
G5                  G69 WAIT FOR READY
M100                G69 R.F. ON
G4XV32              G69 ON FOR V32 SECONDS
                    G69 READ FINAL HEAT TEMPERATURE
                    G69 READ ENERAGY MONITOR
M101                G69 R.F. OFF
                    G69 CHECK TEMPERATURE VS PRE SET LIMITS
                    G69 CHECK ENERGY MONITOR VS PRE SET LIMITS
S 0 V12             G69 RPM QUENCH
XV4                 G69 X QUENCH
V99=V33             G69 SET VARIABLE V99 (QUENCH TIME)
M106                G69 QUENCH ON
                    G69 READ QUENCH PRESSURE
                    G69 READ QUENCH TEMPERATURE
KN50                G69 GO TO SUBROUNINE TIMER
M107                G69 QUENCH OFF
                    G69 CHECK QUENCH PRESSURE VS PRE SET LIMITS
                    G69 CHECK QUENCH TEMPERATURE VS PRE SET LIMITS
S 0 2007            G69 STOP ROTATION
V99=V34             G69 SET VARIABLE V99 (SPIN DRY TIME)
S 0 V13             G69 SPIN DRY
KN50                G69 GO TO SUBROUTINE TIMER
FXV44               G69 FEED RATE TO TEMPER
S 0 V14             G69 RPM TEMPER
XV5                 G69 X TEMPER
G5                  G69 WAIT FOR READY
V99=V35             G69 SET VARIABLE V99 (TEMPER TIME)
M108                G69 A.F. ON
KN50                G69 GO TO SUBROUTINE TIMER
                    G69 READ TEMPER TEMPERATURE
M109                G69 TEMPER OFF
                    G69 CHECK TEMPER TEMPERATURE VS PRE SET LIMITS
FX3000              G69 FEED RATE TO X ZERO
X0                  G69 X TO ZERO
S 0 2007            G69 STOP ROTATION
G54"                         UNCLAMP"
N150 1-M233 N150
Y0                  G69 Y TO ZERO
JN105               G69 LOOP
M2                  G69 END
G69 ****************************************************
G69 ****************************************************
N50                 G69 SUBROUTINE TIMER
N130                G54              " ON FOR"V99F3.0" SECONDS"
G4X.90
V99=V99-1           G69 COUNT DOWN
JV99N130            G69 POSITIVE JUMP TO 130
G54
M6                  G69 END SUBROUTINE
```

```
5   'LISTING A
10  'COIL DESIGN/ADAPTIVE CONTROL   JUNE 1987
20  '       REVISED OCTOBER 1987  MATERIALS SECTION ADDED
30  DIM K(30)
40  OPEN "COIL.OUT" FOR OUTPUT AS #1
50  OPEN "COIL.MAS" FOR OUTPUT AS #3
60  OPEN "KYBD:" FOR INPUT AS #2
70  PI              = 3.141592653589793#
80  DEF FNACOS(ZETA) = -ATN(ZETA/SQR(-ZETA*ZETA+1))+(PI*.5)
90  DEF FNINV(ZETA)  = TAN(ZETA)-ZETA
100 INPUT "CUSTOMER ...................";CUST$
110 INPUT "PART NUMBER ................";PART$
120 INPUT "DATE .......................";DAT$
130 INPUT "PROGRAM NAME ...............";PNAME$
140 INPUT "NUMBER OF TEETH ............";N
150 INPUT "DIAMETRAL PITCH (Normal) ...";PND
160 INPUT "PRESSURE ANGLE (Normal) ....";PHIN
170 INPUT "OD max or ID min ...........";ODORID
180 INPUT "ROOT DIA min,EXT  max,INT ..";DR
190 INPUT "ROOT FILLET RADIUS .........";RF
200 INPUT "ARC TOOTH THICKNESS(normal).";AT
210 INPUT "FACE WIDTH max .............";FACE
220 INPUT "HELIX ANGLE,HAND ...........";PSI,HAND$
230 INPUT "MEASURING PIN or BALL DIA ..";PIND
240 INPUT "0=EXTERNAL or 1=INTERNAL ...";EORI
250 INPUT "COIL TO PART AIR GAP/SIDE ..";AIRGAP
260 INPUT "MATERIALS CODE .............";MATCODE
270 INPUT "CODE 1 (PROCESS) ...........";CODE1
280 INPUT "CODE 2 (MOUNTING) ..........";CODE2
330 IF CODE1=0 THEN A$="PROCESS A"
340 IF CODE1=1 THEN A$="PROCESS B"
350 IF CODE1=2 THEN A$="PROCESS C"
360 IF CODE1=3 THEN A$="PROCESS D"
370 IF CODE2=0 THEN B$="BETWEEN CENTERS"
374 IF CODE2=1 THEN B$="TOP CENTER"
378 IF CODE2=2 THEN B$="BOTTOM CENTER"
380 ' WRITE INPUT DATA
390 GOSUB 1250
400 RADIAN          = PI/180!
410 DEGREE          = 180!/PI
420 PHINR           = PHIN*RADIAN
430 PSIR            = PSI *RADIAN
440 PD              = PND*COS(PSIR):'............  TRANSVERSE DIAMETRAL PITCH
450 D               = N/PD:'....................  PITCH DIAMETER
460 PHIR            = ATN(TAN(PHINR)/COS(PSIR)):' TRANSVERSE PRESSURE ANGLE
470 DB              = D*COS(PHIR):'.............. BASE CIRCLE DIAMETER
480 ATT             = AT/COS(PSIR):'............. TRANSVERSE ARC T
490 '
500 R1              = ODORID*.5:'................ RADIUS, OD or ID
510 R2              = DR*.5:' ................... RADIUS, ROOT DIA
520 F2              = FACE/COS(PSIR):' .......... FACE WIDTH,normal
530 I1              = TAN(PHIR)-PHIR:' .......... INVOLUTE phi
540 PHIX            = FNACOS(DB/(R1*2!)):' ...... phi x, AT OD or ID
550 I2              = TAN(PHIX)-PHIX:' .......... INVOLUTE phi x
```

What is claimed is:

1. A method of induction hardening gears with the aid of a mathematical algorithm in order to compute induction coil specifications and induction machine settings, said method comprising the steps of:
   (a) providing part specification data including diametral pitch which corresponds to the gear to be induction hardened;
   (b) executing said algorithm with said part specification data incorporated;
   (c) deriving induction coil specifications for said gear according to said mathematical algorithm which is preselected according to the type of gear;
   (d) determining induction machine settings according to said mathematical algorithm;
   (e) constructing the specified induction coil according to said induction coil specifications;
   (f) loading said specified induction coil on said induction machine;
   (g) making the determined induction machine settings on the machine;
   (h) heating the gear by induction by way of said induction machine; and
   (i) quenching said gear.

2. The method of induction hardening of claim 1 which includes the additional step of providing a microprocessor for establishing and monitoring induction machine settings.

3. The method of induction hardening of claim 2 wherein said making step includes formatting said induction machine settings onto a computer disk and loading said computer disk into a disk drive which is connected to said microprocessor.

4. A method of induction hardening gears using an induction-hardening machine equipped with a frequency generator, workstation, disk drive and microprocessor, said method comprising the steps of:
   (a) determining specific gear data for the gear to be induction hardened, including diametral pitch number of teeth and face width;
   (b) running a computer algorithm with said specific gear data, said computer algorithm yielding induction coil specification data and induction machine settings for said gear;
   (c) fabricating an induction coil according to said induction coil specification data;
   (d) formatting said induction machine settings onto a computer disk;
   (e) placing the fabricated induction coil and the gear to be hardened at said work station;
   (f) electrically connecting said fabricated induction coil to said frequency generator;
   (g) loading said computer disk into said disk drive which is connected to said microprocessor; and
   (h) activating the induction hardening process according to the induction machine settings on said formatted computer disk.

5. An induction-hardening machine for contour hardening of a gear comprises:
   a workstation designed and arranged to receive said gear;
   a high-frequency generator;
   a high-frequency coil sized to it around said gear and positioned at said workstation, said high-frequency coil being electrically coupled to said high-frequency generator for generating a high-frequency electrical signal through said gear;
   microprocessor means operable to control the timing and duration of said high-frequency electrical signal; and
   data entry means coupled to said microprocessor means including machine control information to make the induction-hardening process of said gear automated, said machine control information being derived from a computer algorithm based on gear parameters, including diametral pitch of the gear.

6. The induction-hardening machine of claim 5 wherein said high-frequency coil is of an angled, annular ring shape.

7. The induction-hardening machine of claim 6 which further includes a low-frequency coil positioned at said workstation.

8. The induction-hardening machine of claim 7 wherein said low-frequency coil is positioned spaced apart from said high-frequency coil and being designed and arranged such that said gear may pass from one coil into the other without interference.

9. The induction-hardened machine of claim 8 which further includes a quench station within said workstation and is positioned such that said gear may move out of said coils and into said quench station.

10. The induction-hardening machine of claim 5 which further includes a low-frequency coil positioned relative to said high-frequency coil such that said gear may move from one coil to the other in axial fashion without interference.

11. The induction-hardening machine of claim 5 wherein said data entry means includes a computer disk formatted with said machine control information.

12. An induction-hardening machine for use in induction hardening of gears, said induction-hardening machine comprising:
   a frequency generator; and
   an induction coil elelctrically coupled to said frequency generator, said induction coil being configured as an angled, annular ring with substantially parallel inner and outer walls.

13. The induction-hardening machine of claim 12 which further includes vertical centers for supporting and rotating one of said gears, said induction coil being generally concentric with the longitudinal axis of said vertical centers.

14. The induction-hardening machine of claim 13 which further includes drive means operable to rotate said gear at a rate above 200 revolutions per minute while said induction coil remains stationary.

* * * * *

UNITED STATES PATENT AND TRADEMARK OFFICE
CERTIFICATE OF CORRECTION

PATENT NO. : 4,845,328
DATED : July 4, 1989
INVENTOR(S) : John M. Storm et al.

It is certified that error appears in the above-identified patent and that said Letters Patent is hereby corrected as shown below:

On the patent cover page, please replace the phrase "16 Claims, 6 Drawing Sheets" to --14 Claims, 6 Drawing Sheets--.

In column 11, line 7, please replace "oves" with --moves--.

In columns 11 and 12 immediately preceding the start of the computer program statement 560, the computer program listings of columns 49 and 50 should be inserted.

In column 52, line 4, please replace "it" with --fit--.

Signed and Sealed this

Fourteenth Day of May, 1991

*Attest:*

HARRY F. MANBECK, JR.

*Attesting Officer*

*Commissioner of Patents and Trademarks*